(12) United States Patent
Fujimoto et al.

(10) Patent No.: US 7,120,739 B2
(45) Date of Patent: Oct. 10, 2006

(54) STORAGE SYSTEM

(75) Inventors: Kazuhisa Fujimoto, Kokubunji (JP); Mutsumi Hosoya, Fujimi (JP); Naoki Watanabe, Hachioji (JP); Kentaro Shimada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 177 days.

(21) Appl. No.: 10/879,230

(22) Filed: Jun. 30, 2004

(65) Prior Publication Data
US 2005/0235081 A1 Oct. 20, 2005

(30) Foreign Application Priority Data
Apr. 14, 2004 (JP) ............................. 2004-118986

(51) Int. Cl.
*G06F 12/02* (2006.01)

(52) U.S. Cl. .................. 711/113; 711/100; 711/111; 711/112; 711/114; 711/147; 711/148; 711/150; 714/5; 714/6; 710/100; 710/105; 710/106; 370/395.7; 370/395.71; 370/395.72; 370/400

(58) Field of Classification Search ............. 711/100, 711/111–113
See application file for complete search history.

(56) References Cited

U.S. PATENT DOCUMENTS

| 5,548,724 | A | * | 8/1996 | Akizawa et al. ............. 709/203 |
|---|---|---|---|---|
| 6,289,419 | B1 | | 9/2001 | Takahashi |
| 6,385,681 | B1 | | 5/2002 | Fujimoto et al. |
| 6,542,961 | B1 | * | 4/2003 | Matsunami et al. ........ 711/114 |
| 6,745,281 | B1 | * | 6/2004 | Saegusa .................... 711/112 |
| 6,792,505 | B1 | * | 9/2004 | Otterness et al. ........... 711/114 |
| 2004/0221105 | A1 | | 11/2004 | Fujimoto et al. |
| 2004/0257857 | A1 | | 12/2004 | Yamamoto et al. |
| 2005/0021874 | A1 | | 1/2005 | Georgiou et al. |
| 2005/0125609 | A1 | | 6/2005 | Satoyama et al. |

FOREIGN PATENT DOCUMENTS

| JP | 2000-99281 | 4/2000 |
|---|---|---|
| JP | 2000-242434 | 9/2000 |

* cited by examiner

*Primary Examiner*—Matthew Kim
*Assistant Examiner*—Zhuo H. Li
(74) *Attorney, Agent, or Firm*—Mattingly, Stanger, Malur & Brundidge, P.C.

(57) ABSTRACT

To provide a storage system with a cost/performance meeting the system scale, from a small-scale to a large-scale configuration. In the storage system, protocol transformation units (10) and data caching control units (21) are connected to each other through an interconnection (31), the data caching control units (21) are divided into plural control clusters (70), each of the control clusters including at least two or more data caching control units (21), control of a cache memory (111) is conducted independently for each of the control clusters (70), and one of the plural data caching control units (21) manages, as a single system, protocol transformation units (10) and the plural control clusters (70) based on management information stored in a system management information memory unit (160).

18 Claims, 36 Drawing Sheets

FIG.14

| VVOL2# | PA# | VVOL1# | PDEV# | RAID CLASS | CAPACITY |
|---|---|---|---|---|---|
| 0 | 0 | 0 | 0,1,2,3 | 5 | 240 GB |
| 1 | | 2 | 8,9,A,B | 5 | 240 GB |
| : | | : | : | : | : |
| 8 | 1 | 1 | 4,5,6,7 | 1 | 160 GB |
| 9 | | 3 | C,D,E,F | : | 320 GB |
| : | | : | : | : | : |

632:VIRTUAL VOLUME 2 NUMBER
610:CONNECTION ADAPTER NUMBER
631:VIRTUAL VOLUME 1 NUMBER
630:PHYSICAL DEVICE NUMBER
605:RAID CLASS
601:VOLUME CAPACITY
651:MANAGEMENT TABLE FOR PHYSICAL DEVICE

FIG.15

| VVOL3# | VVOL2# | CA# | ADDRESS IN VVOL1 | CAPACITY |
|---|---|---|---|---|
| 00 | 0 | 0 | 0x0000000000~0x03FFFFFFFF | 16 GB |
| : | | : | : | : |
| 0F | | 0 | 0x3C00000000~0x3FFFFFFFFF | 16 GB |
| : | : | : | : | : |
| A0 | 8 | 1 | 0x0000000000~0x00FFFFFFFF | 4 GB |
| : | : | : | : | : |

633: VIRTUAL VOLUMES 3 NUMBER
632: VIRTUAL VOLUMES 2 NUMBER
621: NUMBER FOR MANAGEMENT CACHE CONTROL UNIT
641: ADDRESS IN THE VIRTUAL VOLUME 1
602: VOLUME CAPACITY
652: MANAGEMENT TABLE FOR VIRTUAL VOLUME

FIG.16

661:LOGICAL UNIT NUMBER
633:VIRTUAL VOLUMES 3 NUMBER
605:RAID CLASS
621:MANAGEMENT CACHE CONTROL UNIT NUMBER
603:VOLUME CAPACITY

| ACTUAL LUN | VVOL3# | RAID CLASS | CA# | CAPACITY |
|---|---|---|---|---|
| 0 | 00 | 5 | 0 | 16 GB |
| 1 | 01,02 | 5 | | 32 GB |
| 2 | 03 | 0 | | 16 GB |
| : | : | : | | : |
| B | A0,A1,A2 | 1 | 1, 2 | 12 GB |
| : | : | : | : | : |

653:MANAGEMENT TABLE FOR LOGICAL UNIT

FIG.17

670:CONNECTION SERVER NUMBER
661:LOGICAL UNIT NUMBER
615:CONNECTION CHANNEL NUMBER
662:VIRTUAL LOGICAL UNIT NUMBER
611:CONNECTION ADAPTER NUMBER
621:MANAGEMENT CACHE CONTROL UNIT NUMBER

| SERVER# | VIRTUAL LUN | ACTUAL LUN | PA# | CHANNEL# | CA# |
|---|---|---|---|---|---|
| 0 | $LUN_A$ 0,1,2,3 | 0,1,3,8 | 0 | 0 | 0 |
| 1 | $LUN_B$ 0,1,2 | 2,4,5 | 1 | 1 | 0 |
| 2 | $LUN_C$ 0,1,2,3,4 | 6,7,9,A,F | 0 | 0 | 1 |
| : | : | : | : | : | : |

654:MANAGEMENT TABLE FOR LOGICAL UNIT ASSIGNMENT

160:SYSTEM MANAGEMENT INFORMATIONMEMORY UNIT

STORAGE SYSTEM

CLAIM OF PRIORITY

The present application claims priority from Japanese application P2004-118986 filed on Apr. 14, 2004, the content of which is hereby incorporated by reference into this application.

BACKGROUND

The present invention relates to a storage system that is expandable from a small-scale to a large-scale configuration.

Storage systems that save data processed in IT systems have come to play a central role in IT systems due to the penetration of IT systems in business and the expansion of the cooperation of IT systems in business resulting from the development of the Internet. There are numerous types of storage systems ranging from systems of a small-scale configuration to systems of a large-scale configuration.

As one example of a main storage system that provides a small-scale to large-scale configuration, in the prior art, an architecture storage system such as shown in FIG. 36 is disclosed in JP 2000-99281 A. The storage system 8 is disposed with plural channel IF units 11 that execute data transfer with computers 3 (also called "servers" below), plural disk IF units 16 that execute data transfer with hard drives 2, a cache memory unit 14 that temporarily stores data stored in the hard drives 2, and a control memory unit 15 that stores control information relating to the storage system 8 (e.g., information relating to data transfer control in the storage system 8 and management information of data stored in the hard drives 2). The channel IF units 11, the disk IF units 16, and the cache memory unit 14 are connected by an interconnection 41, and the channel IF units 11, the disk IF units 16, and the control memory unit 15 are connected by an interconnection 42. Also, the interconnection 41 and the interconnection 42 are configured by common buses and switches.

In this manner, in the single storage system 8, the cache memory unit 14 and the control memory unit 15 have a configuration that is accessible from all of the channel IF units 11 and the disk IF units 16.

The channel IF units 11 include an interface (host IF) 104 for connecting to the servers 3, a microprocessor 103 that controls input/output with respect to the servers 3, a memory access unit 106 that controls access to the cache memory unit 14, and a memory access unit 107 that controls access to the control memory unit 15. Also, the disk IF units 16 include an interface (disk IF) 105 for connecting to the hard drives 2, a microprocessor 103 that controls input/output with respect to the hard drives 2, a memory access unit 106 that controls access to the cache memory unit 14, and a memory access unit 107 that controls access to the control memory unit 15. The disk IF units 16 also conduct control of RAID.

In the above-described storage system, it has been possible to flexibly change the number of channel IF units 11 and disk IF units 16 because the channel IF units 11 that control data transfer with the servers 3 and the disk IF units 16 that control data transfer with the hard drives 2 are separated and data transfer between the channel IF units 11 and the disk IF units 16 is controlled through the cache memory unit 14 and the control memory unit 15. For this reason, it has been possible for the storage system to have a small-scale to large-scale configuration.

Also, in the prior art disclosed in JP 2000-242434 A, plural disk array devices are connected to plural servers through disk array switches so that the plural disk array devices are managed as a single storage system by system configuration managing means connected to the disk array switches and each disk array device.

SUMMARY

In large corporations represented by banks, securities companies, and telephone companies, there has been a trend to reduce expenditures necessary to run, maintain, and manage computer systems and storage systems by configuring computer systems and storage systems that had conventionally been dispersed in various places into computer systems and storage systems concentrated within a data center.

Additionally, in the midst of the economic slump resulting from effects such as the collapse of the IT bubble, there has been a trend for businesses to curtail initial investments in IT systems and conduct system expansion in response to expansions in business scale. For this reason, scalability of costs and performance with which it is possible to curtail initial investments and expand scale with reasonable investments commensurate with business scale is being demanded of storage systems.

In the prior art shown in FIG. 36, all of the channel IF units 11 and all of the disk IF units 16 execute the reading/writing of data from the servers 3 to the hard drives 2 by controlling data transfer between the channel IF units 11 and the disk IF units 16 through the cache memory unit 14 and the control memory unit 15. For this reason, the access load from all of the channel IF units 11 and all of the disk IF units 16 are concentrated on the cache memory unit 14 and the control memory unit 15.

The performance (data input/output frequency per unit of time and data transfer amount per unit of time) demanded of storage systems are increasing year by year. In order to accommodate this in the future, it is necessary to also improve the data transfer processing performance of the channel IF units 11 and the disk IF units 16.

As described above, all of the channel IF units 11 and all of the disk IF units 16 control data transfer between the channel IF units 11 and the disk IF units 16 through the cache memory unit 14 and the control memory unit 15. Thus, there have been problems in that, when the data transfer processing performance of the channel IF units 11 and the disk IF units 16 is improved, the access load on the cache memory unit 14 and the control memory unit 15 increases, which becomes a bottleneck, and it becomes difficult to improve the performance of the storage system 8 in the future.

It is possible to improve allowable access performance by increasing the scale of the cache memory unit 14 and the control memory unit 15. However, in order to make the cache memory unit 14 and the control unit 15 accessible from all of the channel IF units 11 and disk IF units 16, it is necessary to respectively manage the cache memory unit 14 and the control memory unit 15 as a single shared memory space. Thus, there have been problems in that, when the scale of the cache memory unit 14 and the control memory unit 15 is increased, it is difficult to reduce the cost of the storage system with respect to a small-scale configuration, and it becomes difficult to provide a system of a small-scale configuration at a low cost.

Also, in the prior art shown in JP 2000-242434 A, the numbers of connectable disk array devices and servers can be increased by increasing the number of ports of the disk array switches and connecting plural disk array switches in multi-stages, so that a storage system that can scalably accommodate a small-scale to large-scale configuration can be provided. However, there have been problems in that, because the servers access the disk array devices through the disk array switches, processing to convert the protocol between the servers and the disk array switches into the protocol in the disk array switches at interface portions with the servers in the disk array switches and to convert the protocol in the disk array switches into the protocol between the disk array switches and the disk array devices at interface portions with the disk array devices in the disk array switches arises, so that response performance is inferior in comparison to a case where it is possible to directly access the disk array devices without the intervention of the disk array switches.

It is therefore an object of the present invention to provide a storage system with a cost/performance meeting a system scale, from a small-scale to a large-scale configuration.

More specifically, it is another object of the present invention to provide a storage system which resolves bottlenecks in shared memories of the storage system, realizes lower costs of the storage system with respect to a small-scale configuration, has response performance equal to or higher than that of the conventional disk array devices, can realize scalability of costs and throughput performance depending on the range from a small-scale to a large-scale configuration, and is capable of reducing manufacturing costs therefore.

According to the present invention, a storage system includes: plural protocol transformation units that each include an interface to one of an external equipment and a hard drive unit, and convert, into a protocol within the storage system, a protocol for read and write for data exchanged with the one of the external equipment and the hard drive unit, plural data caching control units that, each include a cache memory that stores data read from/written to the hard drive unit and control the cache memory, and a management information memory unit that stores management information on the storage system. In the storage system, the plural protocol transformation units and the plural data caching control units are connected to each other through an interconnection, the plural data caching control units are divided into plural control clusters, each of the control clusters including at least two or more data caching control units, control of the cache memory is conducted independently for each of the plural control clusters, and one of the plural data caching control units manages, as a single system, the plural protocol transformation units and the plural control clusters based on the management information stored in the management information memory unit.

According to the present invention, it is possible to provide a storage system which resolves bottlenecks in shared memories of the storage system, realizes lower costs of the storage system with respect to a small-scale configuration, and can realize scalability of costs and performance depending on the range from a small-scale to a large-scale configuration.

BRIEF DESCRIPTION OF THE DRAWINGS

FIG. 14 is an explanatory diagram showing a management table for physical device 651 according to the first embodiment of the present invention.

FIG. 15 is an explanatory diagram showing a management table for virtual volume 652 according to the first embodiment of the present invention.

FIG. 16 is an explanatory diagram showing a management table for logical unit 653 according to the first embodiment of the present invention.

FIG. 17 is an explanatory diagram showing a management table for logical unit assignment 654 according to the first embodiment of the present invention.

DETAILED DESCRIPTION OF THE PREFERRED EMBODIMENTS

Embodiments of the present invention will be described below using the drawings.

FIRST EMBODIMENT

Figure 1:
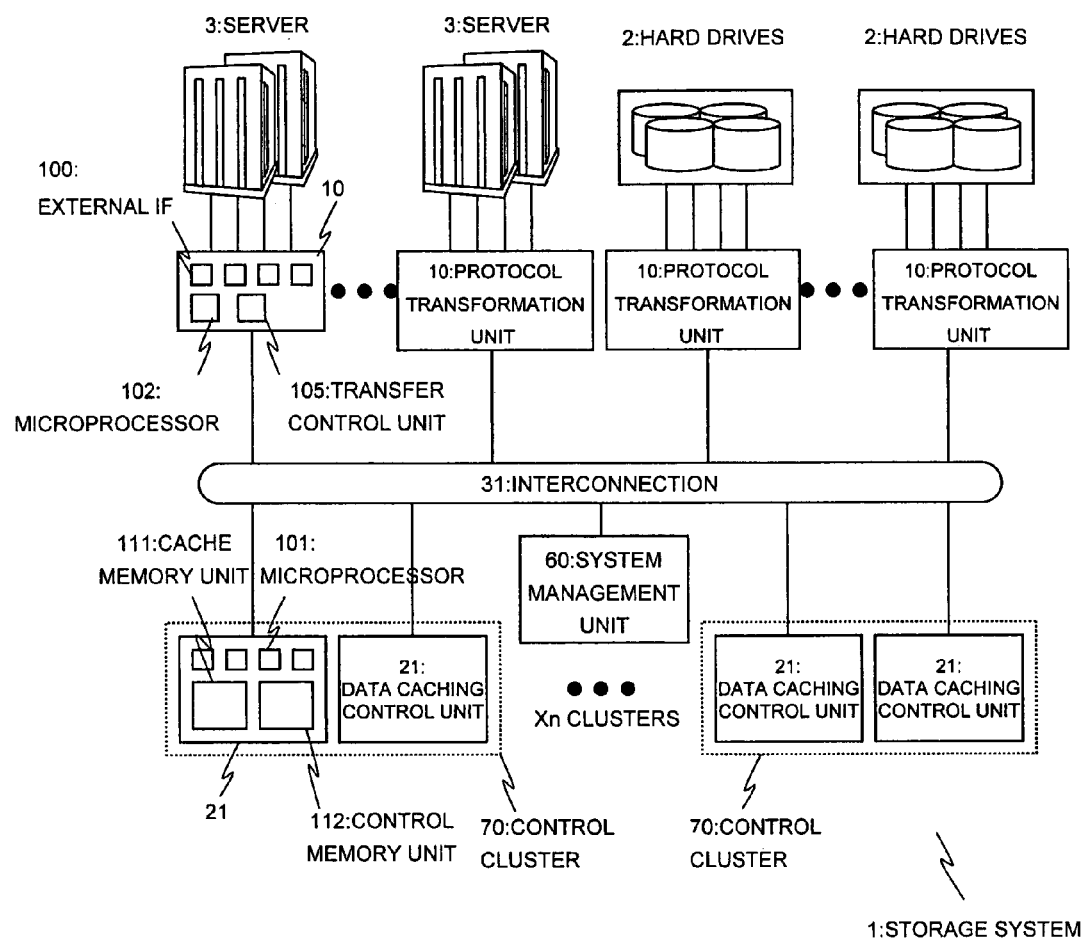
FIG. 1 is a block diagram showing a configuration of a storage system according to a first embodiment of the present invention.

FIG. 1 is a block diagram showing a configuration of a storage system according to a first embodiment of the present invention.

In FIG. 1, a storage system 1 includes protocol transformation units 10, data caching control units 21, a system management unit 60, and hard drives 2, which are connected to the servers 3.

The protocol transformation units 10 are each an interface unit to the server 3 or the hard drives 2. The data caching control unit 21 holds a cache of data stored in the server 3 or the hard drives 2, and also stores control information relating to the hard drives 2. The protocol transformation unit 10 appropriately converts protocols used for control data that is sent to or received from the server 3 or the hard drives 2. The protocol transformation units 10, the data caching control units 21, and the system management unit 60 are connected through an interconnection 31. The system management unit 60 manages information relating to the configuration of the storage system 1.

Figure 2:
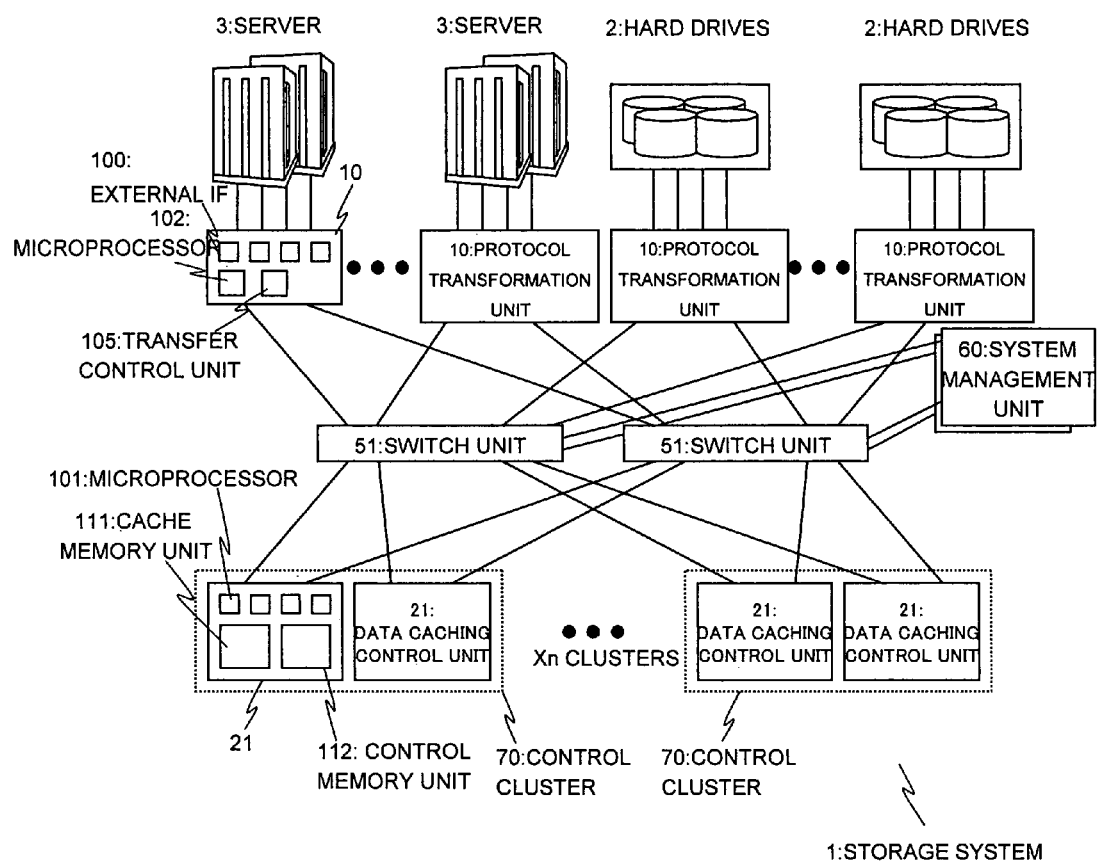
FIG. 2 is a block diagram showing a specific example configuration of an interconnection 31 according to the first embodiment of the present invention.

FIG. 2 is a block diagram showing a specific example configuration of the interconnection 31.

The interconnection 31 includes two switch units 51. One path is connected to each of the two switch units 51 from each of the protocol transformation units 10, the data caching control units 21, and the system management unit 60. Thus, two paths are secured among the protocol transformation units 10, the data caching control units 21, and the system management units 60, so that it becomes possible to raise reliability. Also, the system management unit 60 is connected to the two switch units 51, thereby having redundant paths. Thus, it becomes possible to raise the reliability of the entire system. Here, the numbers of the paths are merely given as examples, and are not intended to be limited to the above-mentioned numbers.

Also, although the interconnection 31 using switches is shown in FIG. 2 as an example, any interconnection can be adopted as long as components are interconnected to one another therethrough and control information and data are transferred therethrough. For example, the interconnection 31 may be configured by a bus.

Figure 3:
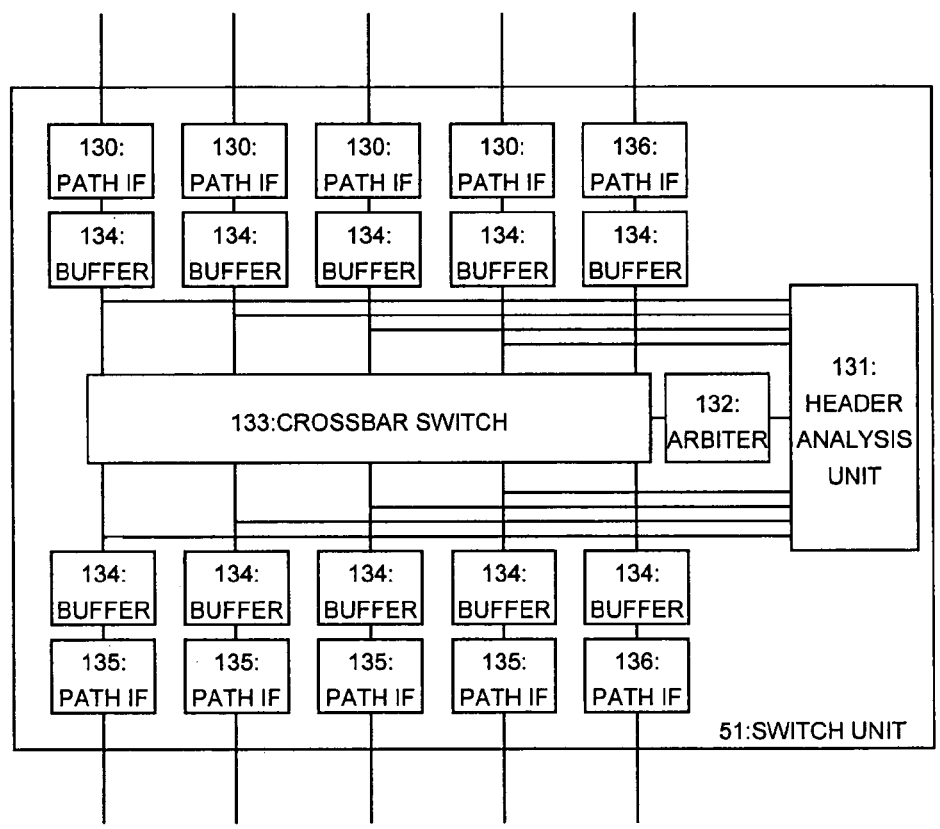
FIG. 3 is a block diagram showing a specific example configuration of a switch unit 51 according to the first embodiment of the present invention.

FIG. 3 is a block diagram showing a specific example configuration of the switch unit 51.

The switch unit 51 includes at least four path interfaces (hereinafter, referred to as "IFs") 130, a header analysis unit 131, an arbitor 132, a crossbar switch 133, four path IFs 135, and two path IFs 136. Each of the path IFs 1-30, 135, and 136 is connected to each of buffers 134, and is further connected to the crossbar switch 133 through the buffer 134.

The path IFs 130 are IFs that connect a connection path with the protocol transformation units 10, and are each connected to each of the four protocol transformation units 10 through one path. The path IFs 135 are IFs that connect a connection path with the data caching control units 21, and are each connected to each of the four data caching control units 21 through one path. The path IFs 136 are IFs that connect a connection path with the system management units 60, and are each connected to each of the two system management units 60 through one path. The buffers 134 buffer packets transferred among the protocol transformation units 10, the data caching control units 21, and the system management units 60.

The arbitor 132 arbitrates signals sent from the respective path IFs to control the crossbar switch 133. The header analysis unit 131 obtains headers contained in the signals sent from the respective path IFs to analyze path IFs that are destinations of the signals.

Figure 4:
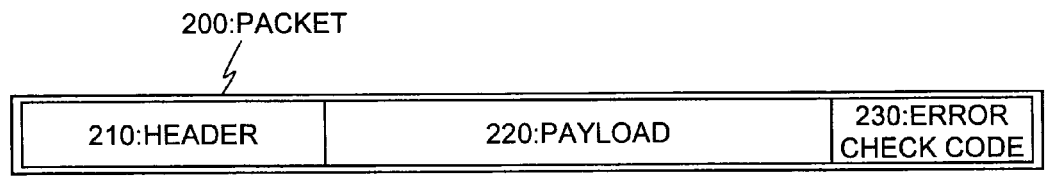
FIG. 4 is an explanatory diagram showing an example of a packet format according to the first embodiment of the present invention.

FIG. 4 is an explanatory diagram showing an example of a format of the packet transferred among the protocol transformation units 10, the data caching control units 21, and the system management units 60.

A packet 200 includes a header 210, a payload 220, and an error check code 230. At least information representing the source and the destination of the packet is stored in the header 210. A command, an address, data, and a status are stored in the payload 220. The error check code 230 is a code for detecting an error within the packet at the time when the packet is transferred.

When packets are inputted to the path IFs 130, 135, and 136, the headers 210 of the packets are sent to the header analysis unit 131. The header analysis unit 131 extracts connection requests for connection among the respective path IFs from the destinations of the packet contained in the received headers, and sends the connection requests to the arbitor 132. The arbitor 132 conducts arbitration based on the connection requests from the path IFs, and as a result of the arbitration, outputs a signal representing connection switching to the crossbar switch 133. The crossbar switch 133 switches the connection within the crossbar switch 133 based on the received signal. Accordingly, the packets can be sent to the path IFs each corresponding to the destination of a signal received by each path IF.

Here in this embodiment, the switch unit 51 is configured to have a buffer at each path IF, but may also be configured to have therein a single large buffer having packet storage areas allocated to respective path IFs. Also, information on the error occurring within the switch unit 51 may be stored in the header analysis unit 131.

Figure 5:
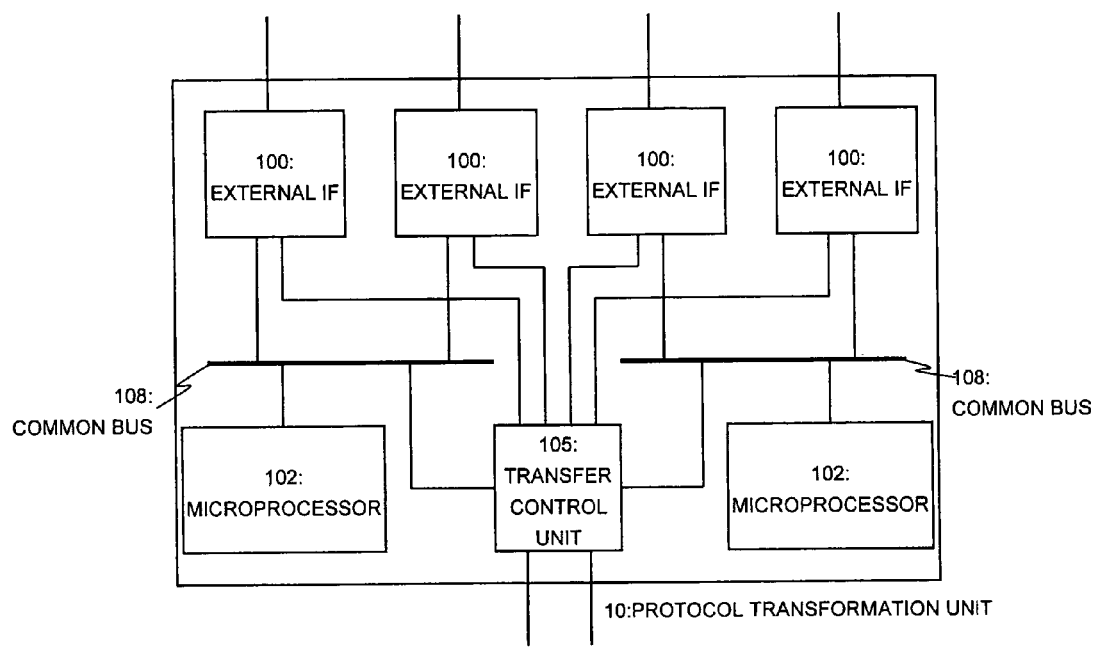
FIG. 5 is a block diagram showing an example configuration of a protocol transformation unit 10 according to the first embodiment of the present invention.

FIG. 5 is a block diagram showing an example configuration of the protocol transformation unit 10.

The protocol transformation unit 10 includes at least four external IFs 100, a data transfer control unit 105, and two microprocessors 102.

The external IFs 100 are each an interface to the server 3 or the hard drives 2. The data transfer control unit 105 controls the transfer of data/control information with the data caching control unit 21 or the system management unit 60. The microprocessor 102 controls the external IFs 100 and the data transfer control unit 105 to thereby inter-convert a data protocol for read and write, which is used between the servers 3 or the hard drives 2 and the external IFs 100, and a data transfer protocol, which is used between the data caching control units 21 or the system management units 60 and the data transfer control unit 105. The microprocessor 102 includes a memory (not shown) connected to itself as a main memory.

Here, the numbers of the external IFs 100, the microprocessors 102, and the like are merely given as examples, and are not intended to be limited to the above-mentioned numbers. Similarly, numbers referred to in all the description below are merely exemplary and are not intended to limit the present invention.

The microprocessors 102 are connected by common buses 108 to the external IFs 100 and the data transfer control unit 105. Also, the external IFs 100 are directly connected to the data transfer control unit 105. The microprocessor 102 inter-converts the data protocol for read and write, which is used between the servers 3 or the hard drives 2 and the external IFs 100, and the data transfer protocol, which is used between the data caching control units 21 or the system management units 60 and the data transfer control unit 105. Under the control by the microprocessor 102, the protocol transformation unit 10 transfers a read/write request from the server 3 to a target data caching control unit 21 or another protocol transformation unit 10. Also, under the control by the microprocessor 102, the protocol transformation unit 10 transfers to the hard drives 2 a read/write request from the data caching control unit 21 or another protocol transformation unit 10.

Here, FIG. 5 merely exemplifies a connection configuration among the microprocessors 102, the external IFs 100, and the data transfer control unit 105, and does not intend to impose any limitations on the connection configuration. There is no problem as long as the connection configuration allows the microprocessor 102 to control the external IFs 100 and the data transfer control unit 105 and allows data to be transferred from the external IFs 100 to the data transfer control unit 105.

Figure 6:
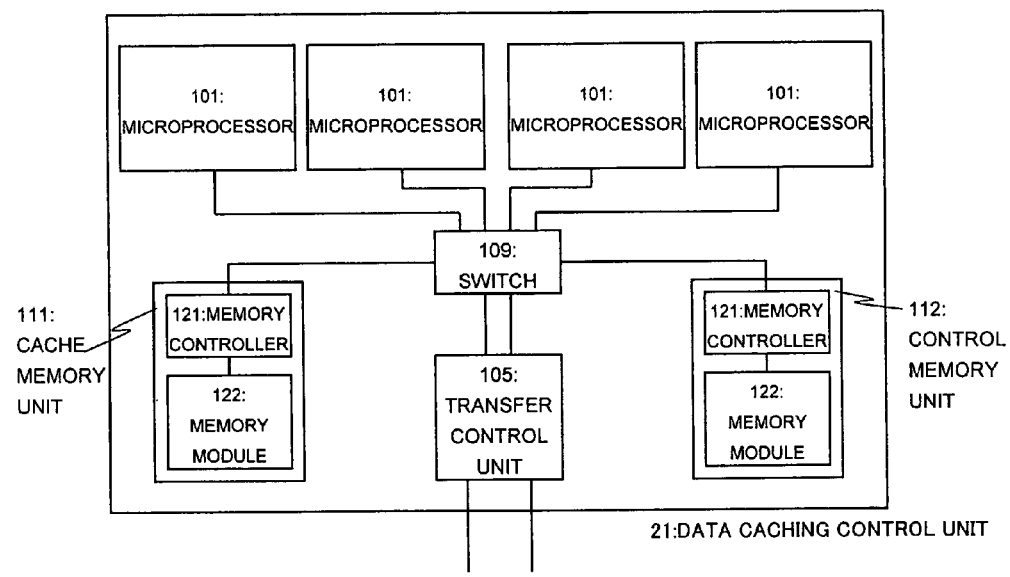
FIG. 6 is a block diagram showing a specific example configuration of a data caching control unit 21 according to the first embodiment of the present invention.

FIG. 6 is a block diagram showing a specific example configuration of the data caching control unit 21.

The data caching control unit 21 includes at least four microprocessors 101, a data transfer control unit 105, a cache memory unit 111, and a control memory unit 112.

The cache memory unit 111 temporarily stores data exchanged with the server 3 or the hard drives 2. The control memory unit 112 stores control information relating to data transfer, management of the cache memory unit 111, and management of the hard drives 2.

Each of the cache memory unit 111 and the control memory unit 112 includes a memory module 122 built thereinto and a memory controller 121 that controls access to the memory module 122. Here, there is no problem if the cache memory unit 111 and the control memory unit 112 each have the same memory controller 121 and memory module 122 and if a cache memory region and a control memory region are allocated to different regions on a single memory space. Also, the microprocessor 101 includes a memory (not shown) connected to itself as a main memory. Alternatively, there is no problem if the four microprocessors 101 have an SMP (Symmetrical multi-processor) configuration where they share the cache memory unit 111 and the control memory unit 112 as their own main memory.

The microprocessors 101, the cache memory unit 111, the control memory unit 112, and the data transfer control unit 105 are connected through a switch 109. The microprocessors 101 refer to control information stored in the control memory unit 112 to control the reading/writing of data to the cache memory unit 111, directory management for the cache memory, data transfer with the protocol transformation units 10, and the exchange of system management information with the system management unit 60. The data transfer control unit 105 also executes so-called RAID processing, or redundant processing for data written to the hard drives 2 connected to the protocol transformation units 10. Alternatively, the RAID processing may be executed in the protocol transformation units 10.

Here, FIG. 6 merely exemplifies the connection configuration among the microprocessors 101, the cache memory unit 111, the control memory unit 112, and the data transfer control unit 105, and does not intend to impose any limitations on the connection configuration. There is no problem as long as the connection configuration allows the microprocessors 101 to control the cache memory unit 111, the control memory unit 112, and the data transfer control unit 105.

Figure 7:
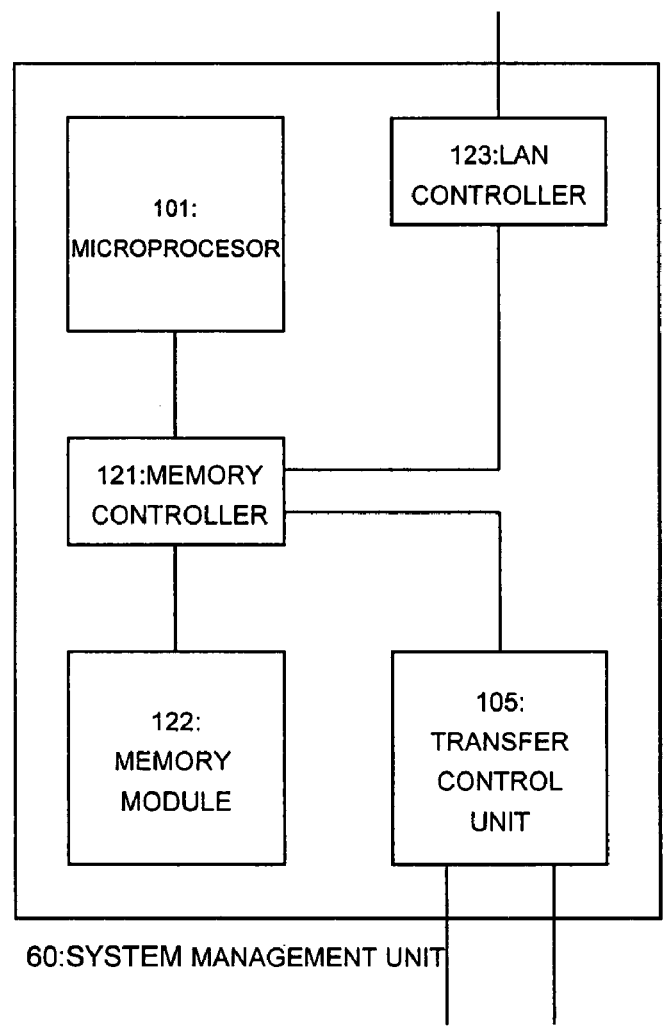
FIG. 7 is a block diagram showing a specific example configuration of a system management unit 60 according to the first embodiment of the present invention.

FIG. 7 is a block diagram showing a specific example configuration of the system management unit 60.

The system management unit 60 includes at least one microprocessor 101, a data transfer control unit 105, a memory controller 121, a memory module 122, and a LAN controller 123. The microprocessor 101 uses the memory module 122 as its own main memory. Alternatively, there is no problem if the microprocessor 101 has, separate from the memory module 122, a memory connected to itself as a main memory.

The microprocessor 101 is connected to the memory module 122, the data transfer control unit 105, and the LAN controller 123 through the memory controller 121. The microprocessor 101 consolidates the management information of the entire storage system 1 due to management information collected from the protocol transformation units 10 and the data caching control units 21, management information of the interconnection 31 and information that the user sets from a management console connected to the LAN controller 123, and stores this management information in the memory module 122. The microprocessor 101 also uses this information to conduct management of the storage system 1. This management information is saved in the hard drives 2 or a nonvolatile memory (not shown) connected to the memory controller 121 to eliminate the fear that the control information is lost due to the error in the system or the like, whereby it becomes possible to raise the reliability of the storage system 1.

Here, the connection configuration among the microprocessor 101, the memory controller 121, the memory module 122, the LAN controller 123, and the data transfer control unit 105 is merely given as an example, and the connection configuration is not intended to be limited thereto. There is no problem as long as the connection configuration allows the microprocessor 101 to control the memory controller 121, the memory module 122, the LAN controller 123, and the data transfer control unit 105. The system management unit 60 further includes a management console for outputting information to a user (administrator) and inputting information from the user.

As shown in FIG. 1, in this embodiment, two data caching control units 21 are consolidated as a single control cluster 70, and management of the cache memory units 111 is closed inside the control clusters 70. That is, the microprocessors 101 within the data caching control units 21 within a given control cluster 70 manage only the cache memory units 111 and control memory units 112 within that control cluster 70 and do not manage the cache memory units 111 and control memory units 112 within another control cluster 70.

Here, the cache memory units 111 within two data caching control units 21 of the control cluster 70 and the control memory units 112 within two data caching control units 21 may be doubled. Therefore, it becomes possible to continue operation in another data caching control unit 21, whose memory is doubled, in a case where an error arises in one data caching control unit 21, so that it becomes possible to improve the reliability of the storage system 1.

In a case where it becomes necessary to multiply store the same data in the cache memory units 111 within plural control clusters 70, the protocol transformation units 10 transferring this data to the data caching control units 21 record, in a predetermined region of the memory in the system management unit 60, control information representing which data is multiply stored in the cache memory units 111 of which control clusters 70. At the same time, the protocol transformation units 10 send, together with the control data to the data caching control units 21, the control information representing the fact that the data is multiply stored data. In a case where data multiply stored in their cache memory units 111 is updated or deleted, the data caching control units 21 send control information representing this fact to the system management unit 60. When the system management unit 60 receives this, it executes processing to renewal or delete the multiply stored data based on control information representing which data recorded in the memory is multiply stored in the cache memory units 111 of which control clusters 70.

As described above, by limiting, to the insides of the control clusters 70, the range of the cache memory units 111 that the microprocessors 101 within the data caching control units 21 control, it becomes possible to reduce the access load on the cache memory units 111 and the control memory units 112 and, as a result, it becomes possible to improve the performance of the storage system 1.

Figure 8:
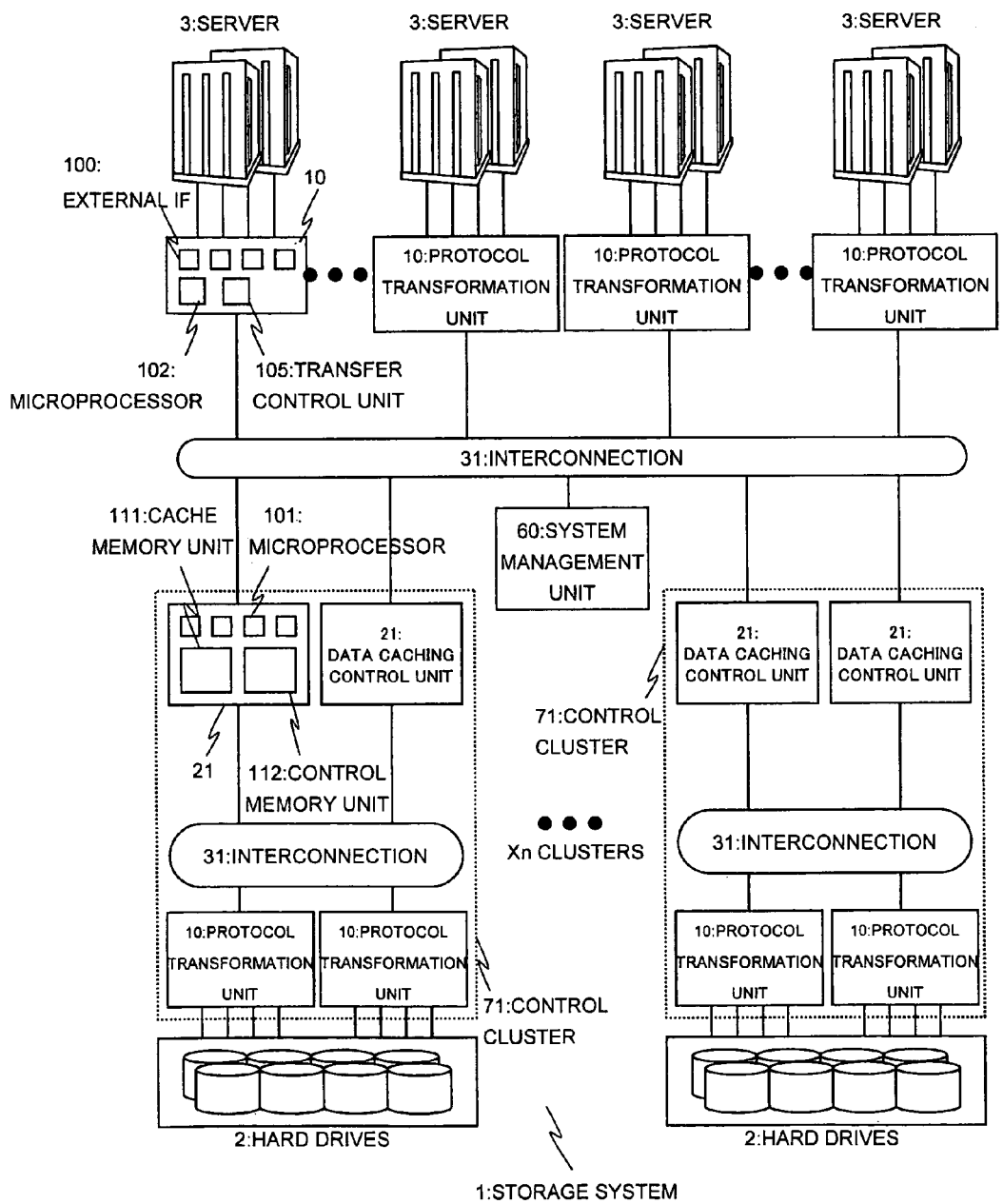
FIG. 8 is a block diagram showing a configuration of the storage system according to a first modified example of the first embodiment of the present invention.

Here, as a first modified example of the first embodiment, a storage system as shown in FIG. 8 will be described. As shown in FIG. 8, a configuration is also conceivable where the protocol transformation units 10 are grouped into protocol transformation units 10 connected to the servers 3 and protocol conversion groups 10 connected to the hard drives 2, two data caching control units 21 and two protocol transformation units 10 connected to the hard drive groups are consolidated as a single control cluster 71, and only data to be recorded or data already recorded in the hard drives 2 connected to the protocol transformation units 10 within that control cluster is stored in the cache memory units 111 within the data caching control units 21 of that control cluster 71. At the same time, management of the cache memory units 111 is closed inside the control clusters 71. That is, the microprocessors 101 within the data caching control units 21 within a given control cluster 71 manage only the cache memory units 111 within that control cluster 71 and do not manage the cache memory units 111 within another control cluster 71.

Here, although an example is shown in FIG. 8 where the interconnection 31 to which the protocol transformation units 10 connected to the servers 3 are linked and the interconnection 31 to which the protocol transformation units 10 connected to the hard drives 2 are linked are separated, the protocol transformation units 10 are physically connected to the same interconnection 31.

Also, the content of the cache memory units 111 and the control memory units 112 may be doubled between two data caching control units 21. Therefore, it becomes possible to continue operation in another data caching control unit 21, whose memory is doubled, in a case where an error arises in one data caching control unit 21, so that it becomes possible to improve the reliability of the storage system 1.

As described above, by limiting, to the insides of the control clusters 71, the range of the cache memory units 111 that the microprocessors 101 within the data caching control units 21 control, it becomes possible to reduce the access load on the cache memory units 111 and the control memory units 112 and, as a result, it becomes possible to improve the performance of the storage system 1.

Also, as described above, the management of the cache memory units 111 relating to the hard drives 2 is closed inside the control clusters 71, so that data is no longer multiply stored in the cache memory units 111 of plural control clusters 71. Thus, coincidence control of data multiply stored in the cache memory units 111 of plural control clusters 70 by the system management unit 60 that had been necessary in the configuration of FIG. 1 becomes unnecessary, the management of the system is simplified, and it becomes possible to further improve the performance of the storage system 1 in comparison to the configuration of FIG. 1.

Figure 9:
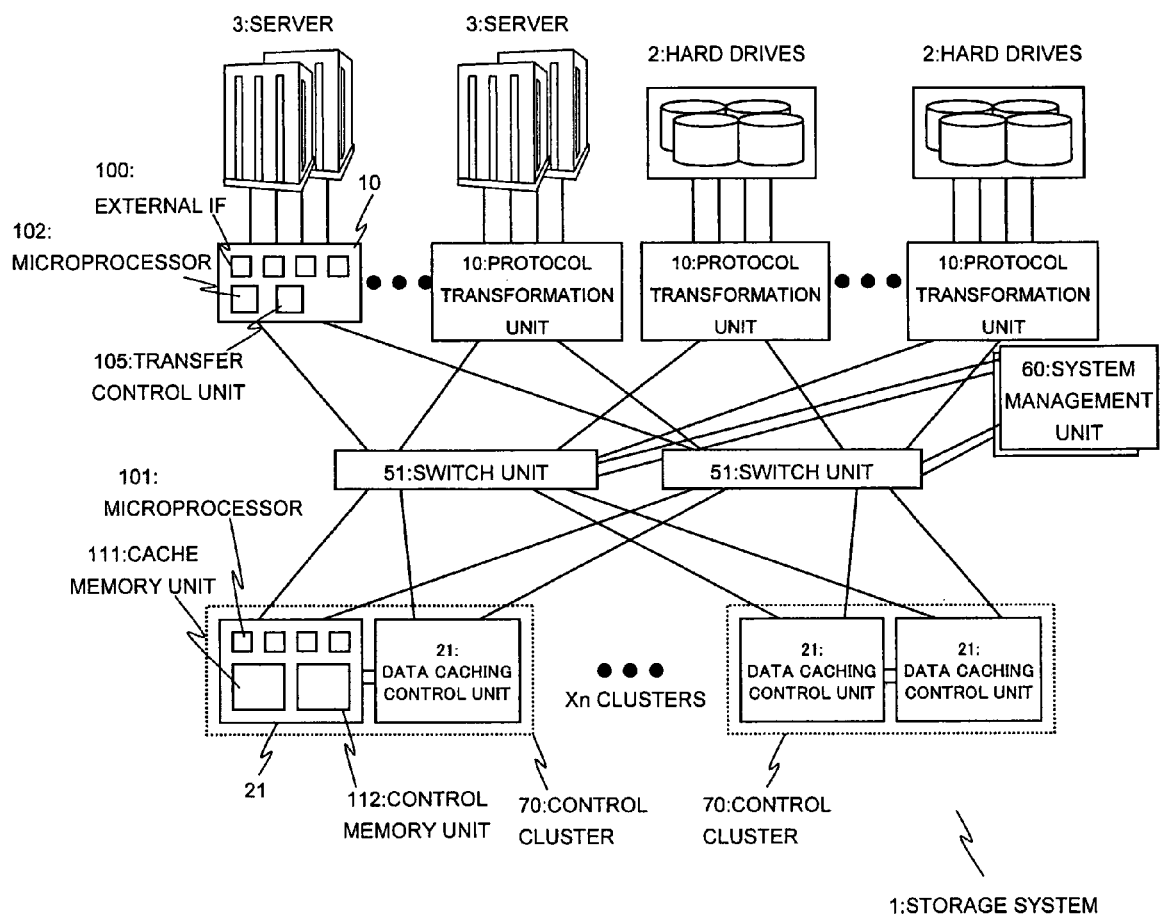
FIG. 9 is a block diagram showing a configuration of the storage system according to a second modified example of the first embodiment of the present invention.

Next, as a second modified example of the first embodiment, a storage system as shown in FIG. 9 will be described. As shown in FIG. 9, two data caching control units 21 in a control cluster 70 are connected by two paths.

Figure 10:
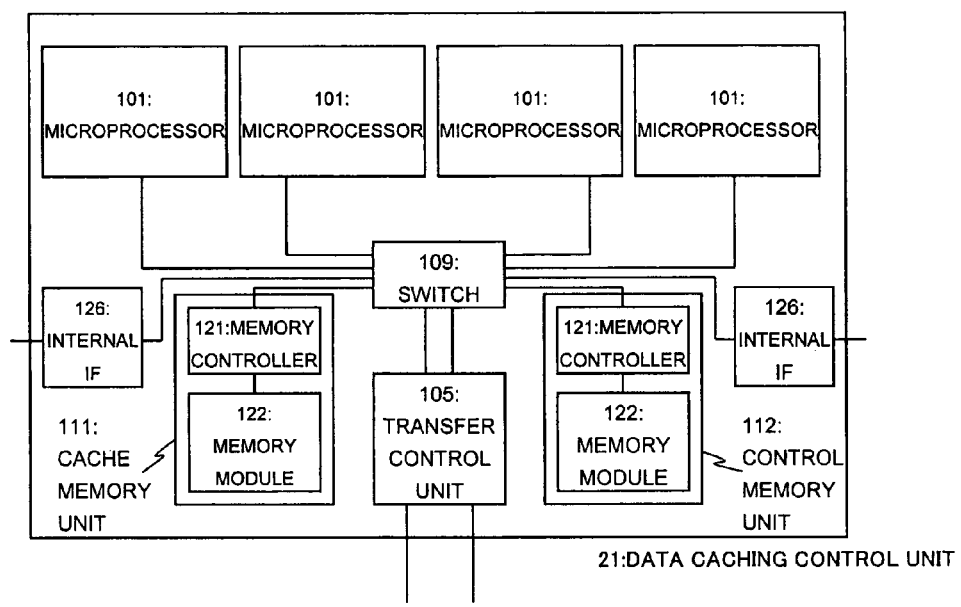
FIG. 10 shows an example of a detailed configuration of the data caching control unit 21 according to a third modified example of the first embodiment of the present invention.

FIG. 10 shows an example of a detailed configuration of the data caching control unit 21 according to a third modified example of the first embodiment.

The data caching control unit shown in FIG. 10 has the same configuration as that of the data caching control unit 21 shown in FIG. 6 except for internal IF 126 connected to the switch 109. Two internal IFs 126 are connected to the switch 109 as shown in FIG. 9. Communication of data and control information is conducted using the connection paths connecting the internal IFs 126 between the two data caching control units 21 configuring the control cluster. By interconnecting the internal IFs 126 of the two data caching control units 21 with connection paths, communication of data and control information is conducted through the connection paths. For example, doubling of information stored in the cache memory units 111 or the control memory units 112 of the two data caching control units 21 is conducted through the connection paths.

Thus, according to the second modified example of the first embodiment shown in FIG. 9, the doubling of the control cluster is conducted. Accordingly, in a case where an error arises in one of the two data caching control units 21 configuring the control cluster 70, reliability is improved because it becomes possible to continue the operation of the storage system with the other data caching control unit.

Figure 11:
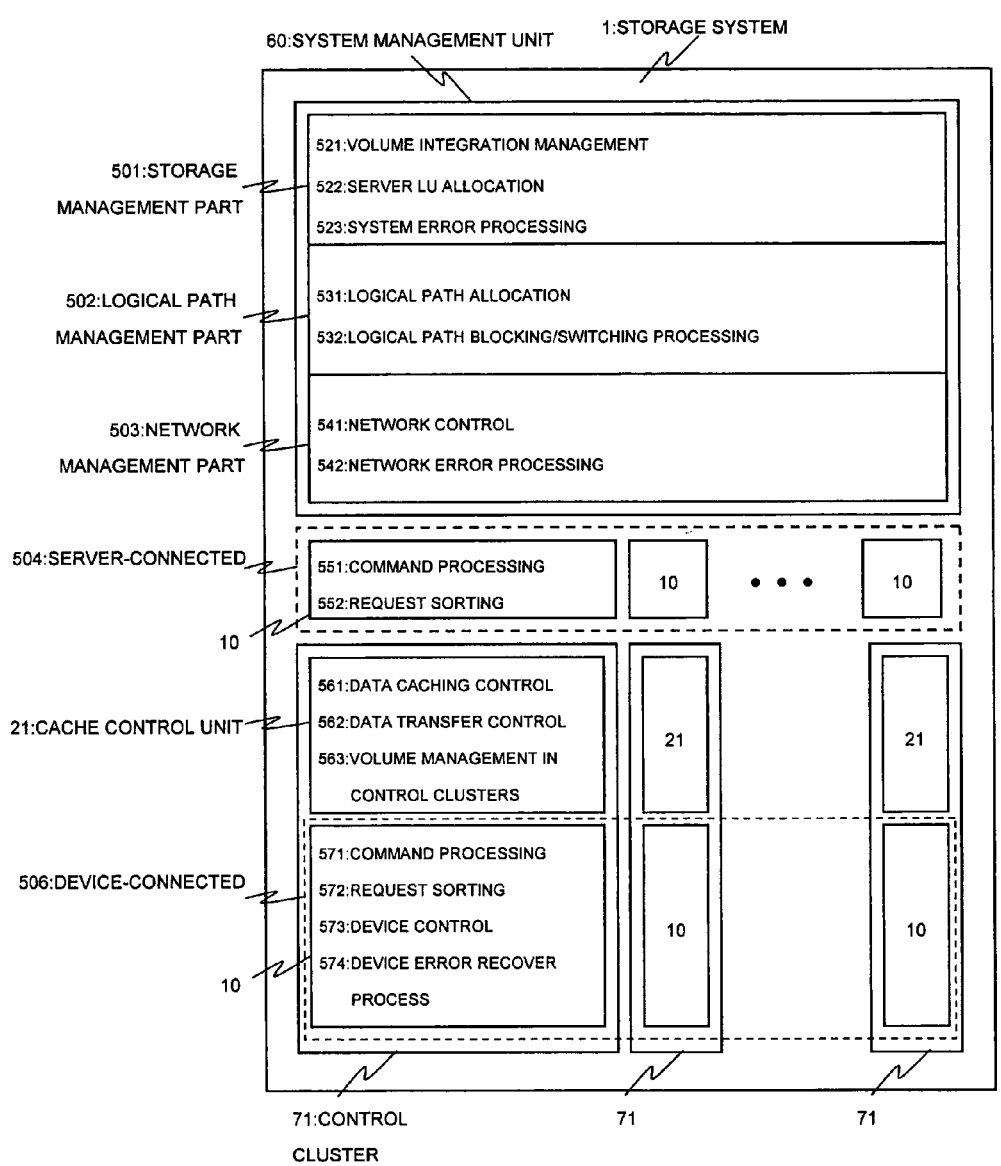
FIG. 11 is a block diagram showing an example of the management configuration of the entire storage system 1 according to the first embodiment of the present invention.

Next, a block diagram shown in FIG. 11 is used to describe an example of the management configuration of the entire storage system 1 according to this embodiment.

Here, description will be made of the example of the management configuration of the storage system 1 of the configuration shown in FIG. 8.

In the system management unit 60, management is conducted by dividing the management of the entire storage system 1 into three layers, i.e., network, logical path, and storage, so that management is simplified. Specifically, the system management unit 60 includes, as software programs, a network management unit 503, a logical path management unit 502, and a storage management unit 501.

Each part shown in FIG. 11 is actually a software program executed by the microprocessor 101 of the system management unit 60. These programs are stored in the memory module 122 of the system management unit 60 through a network or portable storage medium. Moreover, in the following description, this processing is actually executed by the microprocessor 101 of the system management unit 60 in a case where each part shown in FIG. 11 is the subject. Moreover, the processing included in each part is also a program. It should be noted that each part may also be executed by dedicated hardware.

Here, by network is meant the interconnection 31. The network management unit 503 conducts at least network control 541 and error recovery process 542.

For example, in the case of the interconnection configured by the switch units 51 shown in FIG. 2, the network management unit 503 conducts setting of the physical links of the protocol transformation units 10, the switch units 51, the data caching control units 21, and the system management unit 60, migration of the links, and detection/processing of physical errors.

The logical path management unit 502 conducts at least logical path allocation 531 and logical path blockade/switching processing 532. Here, by logical path is meant the logical paths respectively set between the protocol transformation units 10, the data caching control units 21, and the system management unit 60.

For example, in the case where the interconnection 31 is configured by the switch units 51 shown in FIG. 2, the logical path management unit 502 sets the path leading from one protocol transformation unit 10 to one data caching control unit 21 through one switch unit 51 as one logical path. Thus, two logical paths are set between one protocol transformation unit 10 and one data caching control unit 21. Similarly, two logical paths are set between the protocol transformation units 10 and the system management units 60, between the system management units 60 and the data caching control units 21, between the system management units 60 and the protocol transformation units 10, between the system management units 60 and the data caching control units 21, and between the system management units 60 and the system management units 60. In the logical path management unit 502, setting of the logical paths at the time of system startup, blocking in a case where an error has arisen in one of the two logical paths between the units, and processing to switch to the other logical path are conducted.

The storage management unit 501 conducts at least volume integration management 521, server LU (logical unit) allocation 522, and system error recovery process 523. In the volume management 521, the logical volumes respectively managed in each control cluster 71 are integrated and managed. In the server LU allocation 522, an LU is cut out from the integrated logical volumes and allocated to each server 3. Due to the volume management 521 and the server LU allocation 522, it becomes possible to show, with respect to the servers 3, the assembly of plural control clusters 71 conducting respectively independent control as a single storage system 1.

Figure 12:
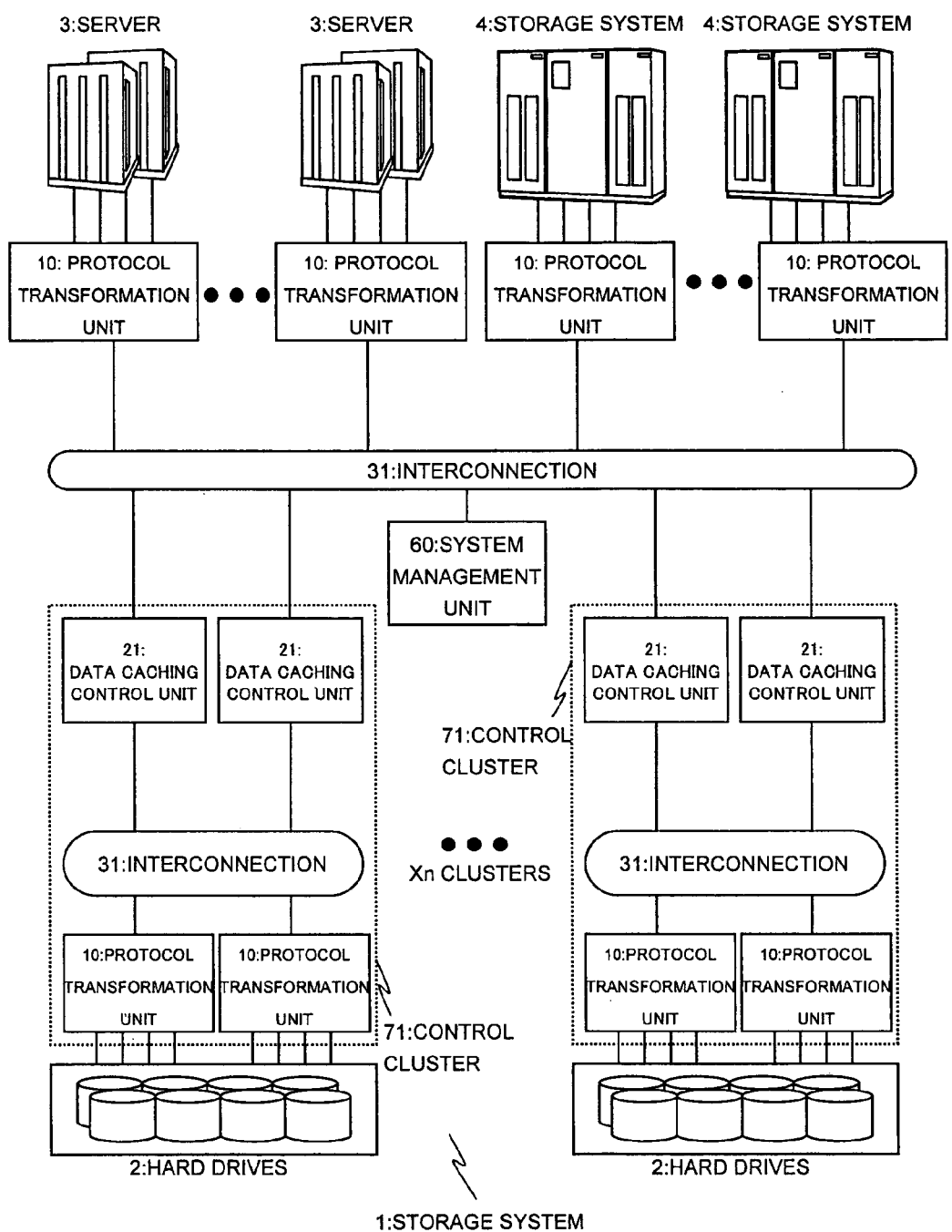
FIG. 12 is a block diagram showing an example of a configuration of the storage system 1 according to the first modified example of the first embodiment of the present invention.

As shown in FIG. 12, as the second modified example, it is also possible to connect other storage systems 4 to the protocol transformation units 10 connecting the servers 3.

In this case, the LUs that the other storage systems provide are also managed in the volume integration management 521, and these LUs are allocated to the servers 3 in the server LU allocation 522, whereby it becomes possible to access the volumes of the other storage systems 4 from the servers 3 through the storage system 1.

Also, in The storage management unit 501, a table representing which servers are connected to which protocol transformation units 10 is managed, whereby communication and data transfer between the plural servers 3 connected to the storage system 1 become possible.

When data transfer is conducted between the servers 3 and the storage systems 4 connected to the protocol transformation units 10, data transfer is conducted between the protocol transformation units 10 through the interconnection 31. In this case, the data may also be cached in the memory of the system management unit 60. The data may also be cached in the cache memory units 111 within the data caching control units 21. Thus, the performance of data transfer between the servers 3 and the storage systems 4 is improved.

Figure 13:
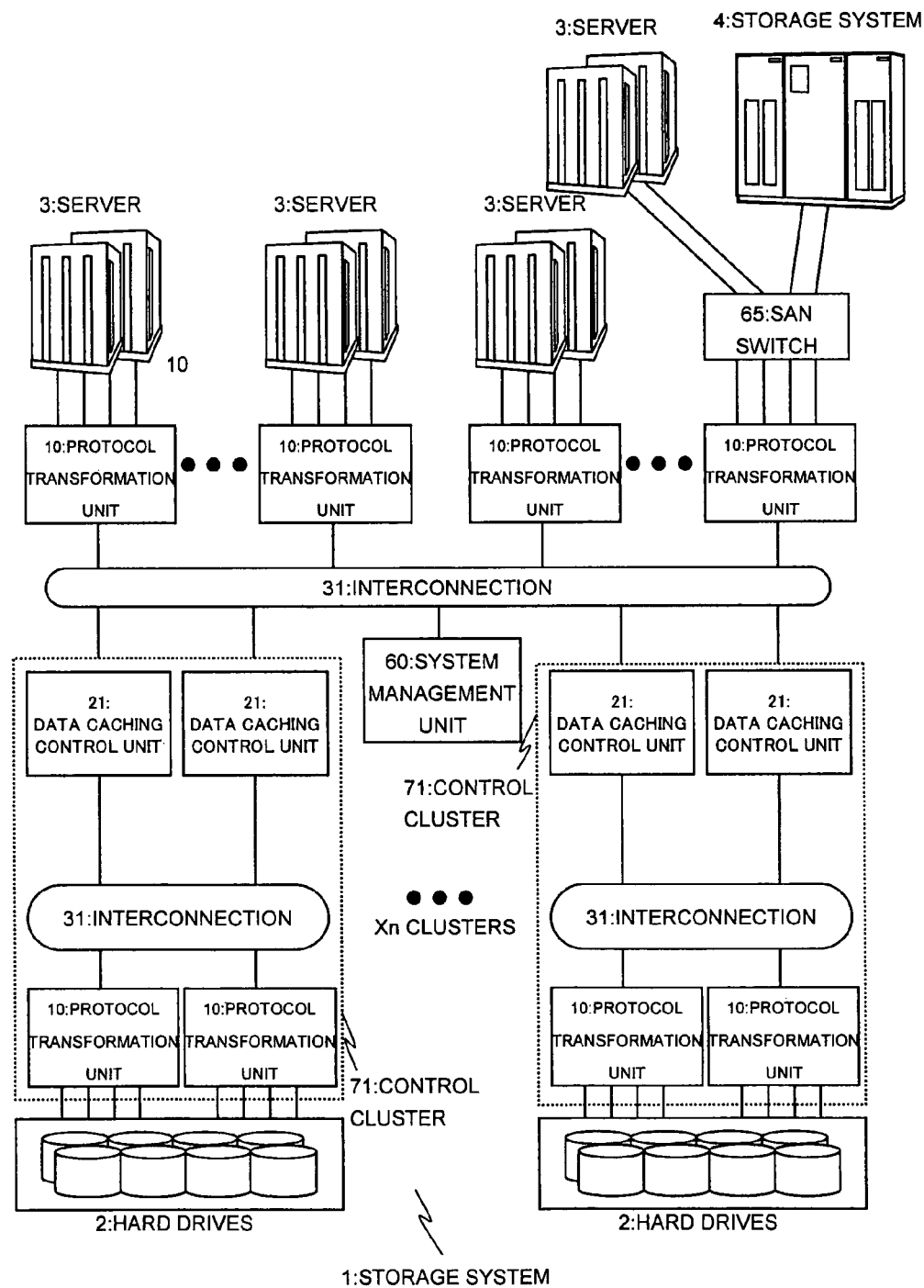
FIG. 13 is a block diagram showing an example of a configuration of the storage system 1 according to the second modified example of the first embodiment of the present invention.

Also, as shown in FIG. 13, as the third modified example with respect to the first modified example of FIG. 12, the storage system 1, server 3, and the other storage system 4 may be connected through a SAN switch 65. Moreover, the external IFs 100 within the protocol transformation units 10 are configured to access the servers 3 and the other storage system 4 through the SAN switch 65. Therefore, it becomes possible to access the servers 3 and the other storage system 4 connected to the SAN switch 65 and a network including plural SAN switches 65 from the servers 3 connected to the storage system 1.

Referring again to FIG. 11, in the system error recovery process 523, respective error information is collected from the protocol transformation units 10 and the data caching control units 21, logical path error information is collected from the logical path management unit 502, and sites to be blockade/replaced in the storage system 1 are determined from this information. Additionally, control information commanding implementation of blockade process is sent to the corresponding sites (the protocol transformation units 10, the data caching control units 21 or the switch units 51), and blockade process is conducted with respect to the corresponding sites that have received the control information. After completion of the blockade process, a message prompting the user to replace the error site is notified to the user (for example, displayed on the management console).

The user follows the message to replace the error site. The user inputs a message indicating completion of the replacement of the error sites with the management console. Control information commanding blockage deletion is sent from the system error recovery process 523 to the corresponding sites in response to the message. Blocking deletion processing is conducted with respect to the sites that have received the control information. After the completion of the blockage deletion processing, the system returns to normal operation.

As described above, the system management unit 60 manages the entire storage system 1 by dividing management into three layers, i.e., network, logical path, and storage, within the system management units 60.

Here, there is no problem even if control of the system is conducted using the network management unit 503 and the logical path management unit 502 as a single management unit.

Figure 36:
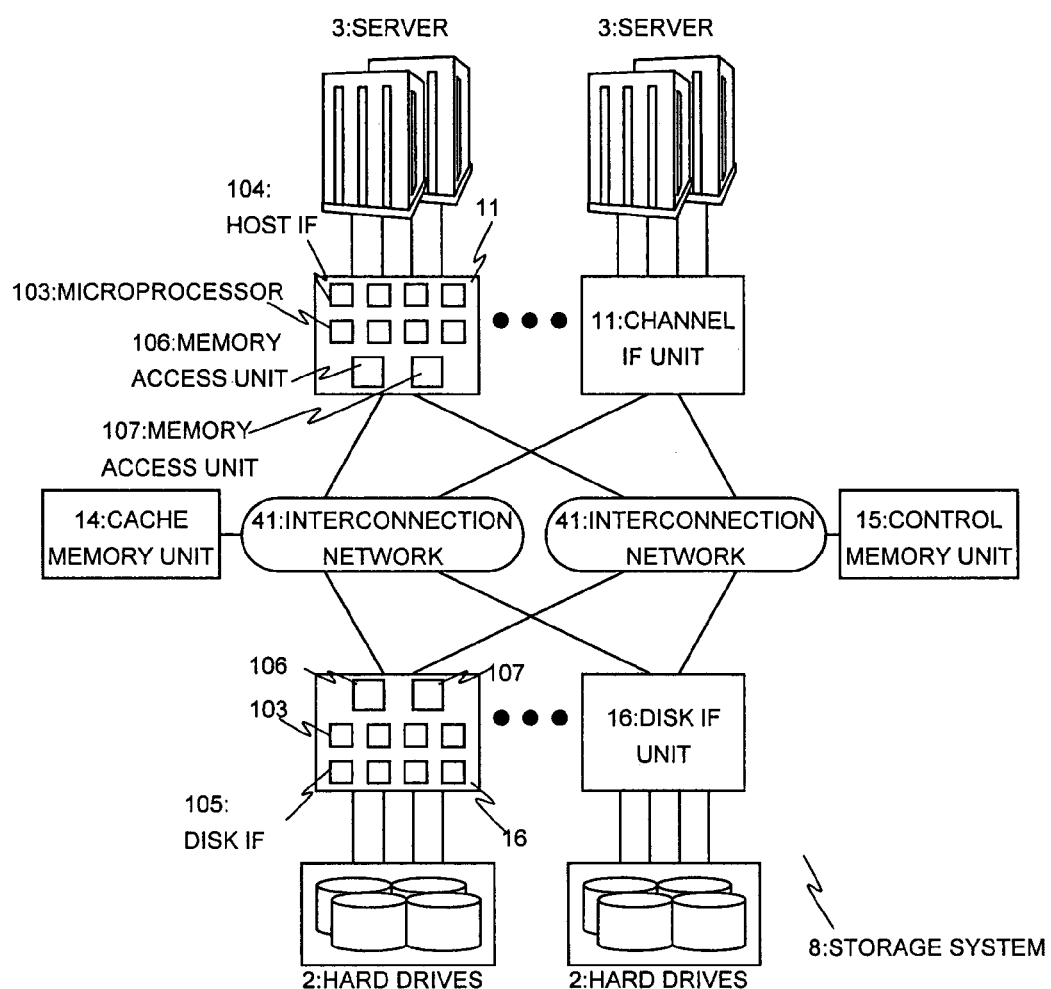
FIG. 36 is a block diagram showing a configuration of the storage system according to a conventional art.

In this embodiment, the sending and reception of commands/data to and from the servers 3, command analysis and sorting processing of requests from the servers 3 that had been conducted in the channel IF units 11, and the sending and reception of commands/data to and from the hard drives 2, command analysis and sorting of requests to the hard drives 2 that had been conducted in the disk IF units 16 in the prior art shown in FIG. 36 are separated as processing of the protocol transformation units 10 from the channel IF unit 11, and other processing of the channel IF units 11 and the disk IF units 16 is consolidated as processing in the data caching control units 21.

Thus, in the data caching control units 21, at least data caching control 561, data transfer control 562, and volume management in control clusters 563 are conducted. In the data caching control 561, control of the reading/writing of data to the cache memory units 111, management of the directories within the cache memory units 111 stored in the control memory units 112 and hit/miss processing that checks whether or not requested data is present in the cache memory units 111 are conducted. In the data transfer control 562, control of data transfer between the protocol transformation units 10 and the cache memory units 111 is conducted. In the volume management in control clusters 563, logical volumes within the control clusters are configured from the physical volumes of the hard drives 2, and a table representing this is managed.

Also, the protocol transformation units 10 are divided into a server-connected group 504 that is the group of protocol transformation units 10 connected to the servers 3 and a device-connected group 506 that is the group of protocol transformation units 10 connected to the hard drives 2.

The protocol transformation units 10 included in the server-connected group 504 at least conduct command processing 551 and request sorting 552. In the command processing 551, the sending and reception of commands to and from the servers 3 are conducted, and analysis of commands from the servers 3 and issuance of commands to the servers 3 are conducted. In the request sorting 552, data and data read/write commands from the servers 3 are converted into the internal protocol and transferred to the corresponding data caching control units 21 or protocol transformation units 10. Also, in request sorting 572, commands and data from the data caching control units 21 or the protocol transformation units 10 to the servers 3 are converted from the internal protocol into the protocol between the servers 3 and the protocol transformation units 10 and sent to the servers 3.

The protocol transformation units 10 belonging to the device-connected group 506 at least conduct command processing 571, the request sorting 572, device control, and device error processing.

In the command processing 571, the sending and reception of commands to and from the devices are conducted, and issuance of commands to the devices and analysis of replies from the devices are conducted. In the request sorting 572, data and data read/write commands to the devices are converted from the internal protocol into the protocol between the devices and the protocol transformation units and transferred to the corresponding devices. Also, replies and data from the devices are transferred to the corresponding data caching control units 21 or the protocol transformation units 10. In the device control 573, control of reading/writing to the devices is conducted. In the device error recovery process 574, blocking/replacement processing of the devices is conducted in a case where an error has occurred in the devices.

As described above, by consolidating and conducting, in the data caching control units 21, processing that has been divided between and conducted by the channel IF units 11 and the disk IF units 16 in the prior art shown in FIG. 36, it becomes possible to improve the performance of the storage system 1 because communication process conducted between the channel IF units 11 and the disk IF units 16 through the control memory unit 15 for data transfer is eliminated.

In this embodiment, the term "device" refers to the hard drives 2, but any device can be adopted as long as the device records block type data. For example, an optical disk may be adopted.

Although the management configuration in the storage system 1 of the configuration shown in FIG. 8 was described above, in the case of the configuration shown in FIG. 1, processing that conducts coincidence control of data multiply stored in the cache memory units of the plural control clusters is added to the system management unit 60, whereby the same processing becomes possible.

Next, examples of the relation between the physical volumes and the logical volumes, the relation between the logical volumes and the logical units, and the relation of allocation of the logical units to the servers are shown in FIGS. 14 to 17. Below, the logical volumes are called virtual volumes.

FIG. 14 is an explanatory diagram showing a management table for physical device 651. That is, FIG. 14 shows the relation between physical devices (in this example, the hard drives 2) and virtual volumes in which the multiple physical devices are consolidated as a single volume. A physical device number (PDEV#) 630 is an identification number respectively corresponding to one hard drive. One virtual volume 1 is configured from four physical devices, and a clearly specified number is allocated to these inside the control clusters 71 as virtual volume 1 number 631. Also, a RAID class 605 information representing the RAID configuration of the virtual volume 1. A volume capacity 601 is information representing the capacity of the virtual volume 1. Also, a connection adapter number 610 representing which volume is managed by which protocol transformation unit (also called protocol conversion adapter (PA) below) 10 is added to the virtual volume 1 within the control clusters 71. A virtual volume 2 number 632 is one where the system management unit 60 allocates a clearly specified number in the entire storage system 1 in order to integrally manage all virtual volumes 1 of the plural control clusters 71.

Portions other than the virtual volume 2 number 632 of the management table for physical device 651 are created in the data caching control units 21 for each control cluster 71 at the time of system initialization, these are registered in the system management unit 60, and the system management unit 60 creates a table (the management table for physical device 651) where the virtual volume 2 number 632 is allocated based on the tables from all of the control clusters 71. Additionally, a copy of the portions relating to each control cluster 71 in this table is transferred to the data caching control units 21 of the corresponding control clusters 71, and each data caching control unit 21 stores this in the control memory units 112.

In a case where there has been a change in the configuration of the hard drives 2, the data caching control units 21 managing the hard drives 2 change the portion other than the virtual volume 2 number of the management table for physical device 651 and register this in the system management unit 60. The system management unit 60 changes the management table for physical device 651 based on the registered information and transfers a copy of the portion of the table relating to each of the control cluster 71 to the data caching control unit 21 in the corresponding control cluster 71. The respective data caching control units 21 store the copy in the control memory unit 112.

Here, there is no problem if all of the information necessary to create the management tables for physical device 651 is transferred from the data caching control units 21 to the system management unit 60 and all of the management tables for physical device 651 are created in the system management unit 60 based on this.

FIG. 15 is an explanatory diagram showing a management table for virtual volume 652. Because the virtual volume 1 (or the virtual volume 2) is configured from plural hard drives, the capacity thereof becomes greater than several hundred GB. Thus, in order to improve the ease with which the user can use this, the virtual volume 1 (or the virtual volume 2) is divided into plural virtual volumes 3 with a small capacity.

The management table for virtual volume 652 is a table for showing the relation between a virtual volumes 3 numbers 633 and addresses 641 within the virtual volume 1. Also included in the management table for virtual volume 652 are management number for data caching control unit 621 that represent which data caching control units 21 manage the virtual volume 1.

Here, in a case where the capacity of the hard drives is small (several GB), or in a case where the capacity of the logical unit necessary for the user has become larger from several tens to several hundreds of GB, it is not necessary to create the virtual volumes 3. The system management unit 60 creates the management table for virtual volume 652 based on information of the virtual logical volumes 1 transferred from the data caching control units 21.

FIG. 16 is an explanatory diagram showing a management table for logical unit 653.

The management table for logical unit 653 shows the relation between the virtual volumes 3 and the logical units that are actually provided to the user. The logical units are configured from one or more virtual volumes 3. In the management table for logical unit 653, the relation between logical unit numbers 661 and the virtual volume 3 numbers 633 configuring the logical units is shown. As for the logical unit numbers 661, numbers determined at positions in the entire storage system 1 are allocated. Also, RAID classes 605 of the virtual logical volumes 1 to which the logical units belong are also shown in order to show the reliability of the logical units. Also, management number for data caching control unit 621 that represent which data caching control units 21 manage the virtual volumes 3 configuring the logical units are shown.

There is no problem even if the logical units are configured from plural virtual volumes 3 where the management data caching control units are different. Therefore, the load on the data caching control units 21 is distributed and it becomes possible to improve the performance of the storage system 1 because access with respect to one logical unit is dispersed to plural data caching control units 21.

FIG. 17 is an explanatory diagram showing a management table for logical unit assignment 654.

The management table for logical unit assignment 654 shows the relation between connection server numbers 670 and the logical units allocated to the servers.

In a case where plural logical units are allocated with respect to the servers, it is necessary to allocate, from 0, the numbers of the respective logical units allocated to the servers. Thus, virtual logical unit numbers 662 that begin with 0 are allocated and the logical units are provided with respect to the servers. The management table for logical unit assignment 654 also shows the relation between the virtual logical unit numbers 662 and logical unit numbers 661.

Also, connection adapter numbers 611 and connection channel numbers 615 that represent which connection channels of which protocol transformation units 10 the servers are connected to be shown. Moreover, management number for data caching control unit 621 representing which data caching control units 21 manage the virtual volumes configuring the logical units are also shown. The management number for data caching control unit 621 are necessary in order to know, without having to ask the system management unit 60, which data caching control units 21 the protocol transformation units 10 to which the servers are connected should access with respect to access requests from the servers. Therefore, it becomes possible to reduce response time with respect to access requests from the host.

Incidentally, the system management unit 60 creates/manages the management table for logical unit assignment 654 based on information from the protocol transformation units 10 to which the servers 3 are connected and user setting information from the management console. Additionally, the system management unit 60 transfers, to the corresponding protocol transformation units 10, a copy of the portions relating to each protocol transformation unit 10 in this table, and each protocol transformation unit 10 stores this in the memory connected to the microprocessor 102.

In a case where there has been a change in the connection configuration of the servers or allocation of the logical units, the system management unit 60 changes the management table for logical unit assignment 654 and transfers a copy of the portion relating to each protocol transformation unit 10 within the table to the corresponding protocol transformation units 10, and the protocol transformation units 10 store this in the memory (not shown) connected to the microprocessors 102.

All or some of the tables shown in FIGS. 14 to 17 are displayed on a monitor of the management console so that the user can set all or some of the relations between the logical units, the virtual volumes, and the physical devices from the management console.

In this embodiment, plural types of volumes were configured from physical devices to logical volumes and logical units provided to the user, but this was one example and it is not necessary for the volumes to have the same configuration as this. What is necessary are the functions of independently configuring/managing the volumes within the control clusters 71, integrally managing in the system management unit 60 the volumes that all of the control clusters 71 in the storage system 1 provide, and cutting out volumes from those and supplying them to the user, whereby the present invention can be implemented.

Figure 18:
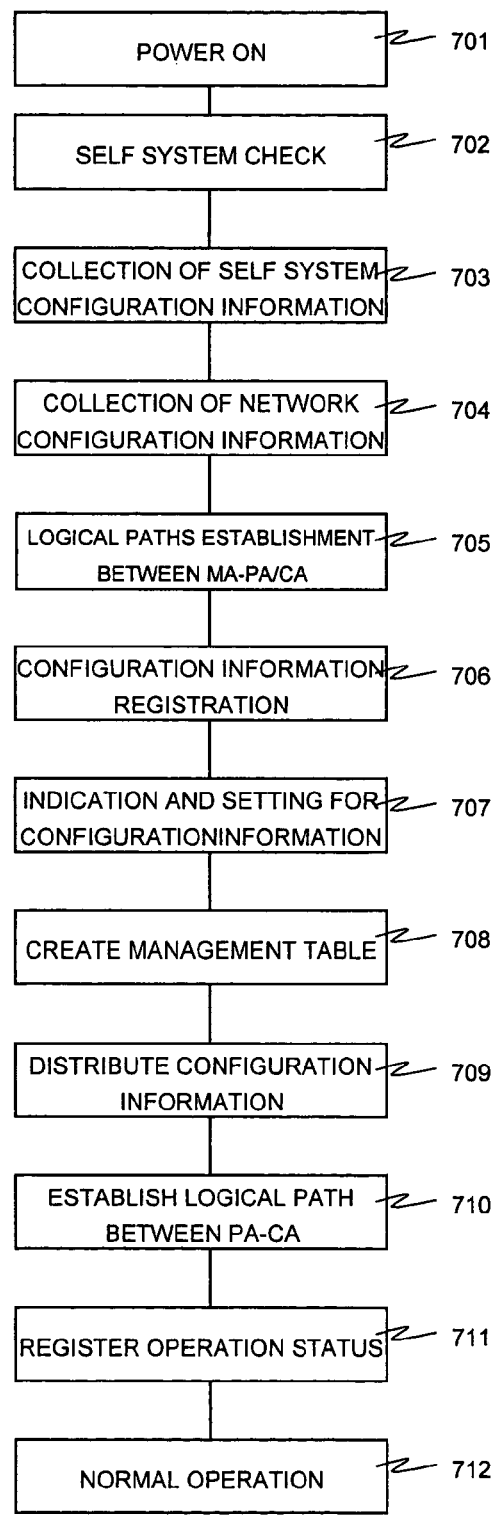
FIG. 18 is a flow chart showing an example of an operation flow at the time of system initialization of the storage system 1 according to the first embodiment of the present invention.

FIG. 18 is a flow chart showing an example of an operation flow at the time of system initialization of the storage system 1.

First, when the power of the system is switched ON (701), the protocol transformation units 10, the data caching control units 221, and the system management unit 60 conduct a self system check (702). In the self system check (702), each of the protocol transformation units 10, the data caching control units 221, and the system management unit 60 conducts an internal diagnostic to check whether the unit is normally operating or if there is an error. If there is an error, the unit notifies the system management unit 60 of this in later configuration information registration (706). In the case of an error for which notification cannot be given, a display unit indicating the error in the unit is switched ON.

When the self system check 702 determines the normal operation, each of the protocol transformation units 10, the data caching control units 221, and the system management unit 60 collects self system configuration information (ID number identifying the unit, processor number identifying the processor in the unit, processor type/specification, memory capacity, etc.) (703). At this time, the protocol transformation units 10 to which the hard drives 2 are connected check the configuration of the hard drives 2 connected to them and check to see if there is an error in the hard drives. In a case where there is an error in the hard drives, the protocol transformation units 10 notify the system management unit 60 of this in the later configuration information registration 706.

Next, the network management unit 503 in the system management unit 60 collects the information of the physical links of the interconnection 31 and checks the configuration of the interconnection 31 (704). After the self system configuration information collection 703, the protocol transformation units 10, and the data caching control units (also called "CA" below) 21 wait for an amount of time necessary for the system management unit (also called "MA" below) 60 to conduct network configuration information collection (or a preset amount of time), and then establish logical paths with the system management unit 60 (705). Thereafter, the protocol transformation units 10 and the data caching control units 21 register, in the system management unit 60, their self system configuration information that they have collected (706). At this time, as described above, the system management unit 60 is also notified of error information.

Next, the system management unit 60 indicates some or all of the management tables of the configuration information shown in FIGS. 14 to 17 (as shown in the drawings, portions for which user setting is necessary are empty tables rather than tables where the relations between the respective numbers are all set) on the monitor of the management console connected to the system management terminal 60, and has the user conduct setup of some or all of the relations between the physical devices, the virtual volumes and the logical units on the management console (707).

Next, the system management unit 60 completes the management tables shown in FIGS. 14 to 17 based on settings from the user and stores these in the memory in the system management unit 60 (708). These management tables are also stored in one or both of the nonvolatile memory in the system management unit 60 or a hard drive among the hard drives 2 for when an error arises.

Next, a copy of the portions in the management tables respectively relating to each protocol transformation unit 10 and each data caching control unit 21 is distributed to each protocol transformation unit 10 and each data caching control unit 21, and each unit to which the copy has been distributed stores the copy in its own memory (709).

Next, the protocol transformation units 10 reference the management tables relating to them that have been distributed from the system management unit 60, check the data caching control units 21 for which it is necessary for them to access, and establish logical paths with the corresponding data caching control units 21 (710).

Finally, the protocol transformation units 10 and the data caching control units 21 determine whether all initialization operations have ended normally and notify the system management unit 60 of the result. The system management unit 60 confirms the notification of normal completion of initialization of all of the protocol transformation units 10 and the data caching control units 21 and confirms normal completion of its own initialization (711). After confirmation of normal completion of all initialization, normal read/write operations begin (712).

Figure 19:
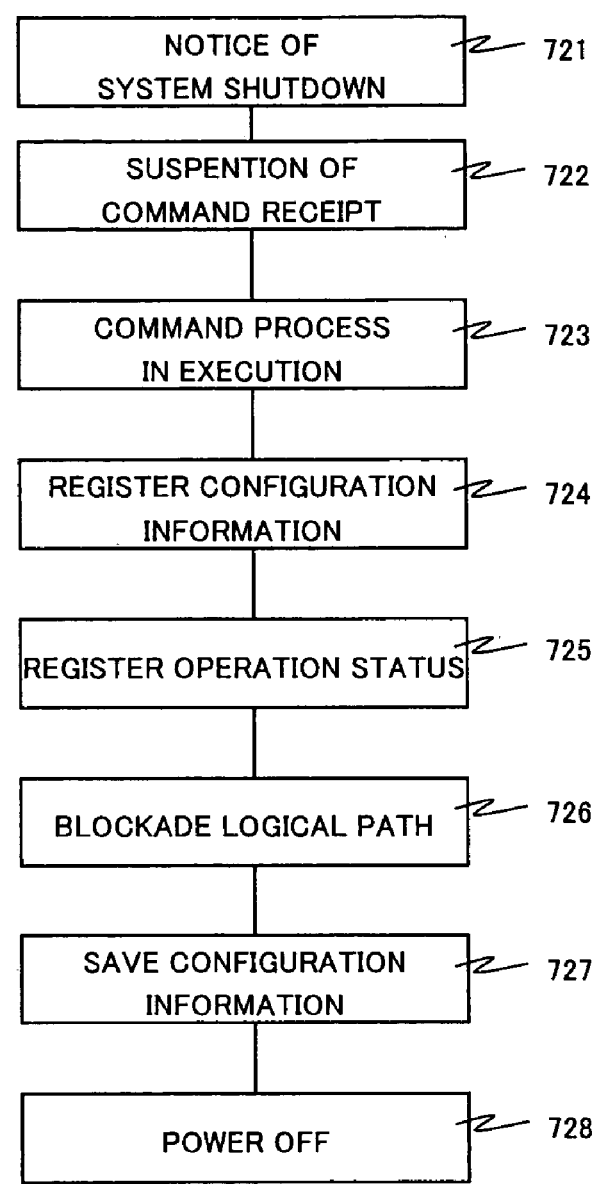
FIG. 19 is a flow chart showing an example of an operation flow at the time of system shutdown of the storage system 1 according to the first embodiment of the present invention.

FIG. 19 is a flow chart showing an example of an operation flow at the time of system shutdown of the storage system 1.

First, when a notice of system shutdown is issued from the management console (721), the system management unit 60 issues control information instructing command reception termination to the protocol transformation units 10 and the data caching control units 21. When the units receive this control information, each unit suspend commands receipt (722). After the suspension of command receipt, the protocol transformation units 10 and the data caching control units 21 execute all command processes that have already been received (723). Next, the protocol transformation units 10 and the data caching control units 21 collect their self system configuration information in the same manner as at the time of initialization and register the configuration information in the system management unit 60 (724). Next, the protocol transformation units 10 and the data caching control units 21 register, in the system management unit 60, the fact that operation shutdown is possible (725).

Thereafter, the protocol transformation units 10 block the logical paths with the data caching control units 21. Also, the protocol transformation units 10 and the data caching control units 21 block the logical paths with the system management unit 60 (726).

Finally, the system management unit 60 saves, in the nonvolatile memory, the configuration information registered from the protocol transformation units 10 and the data caching control units 21 and the configuration information within the system management unit 60 (727). Thereafter, the display indicating that the system is ready to be shut down (for example, "System Shutdown Process Completed, Able to Turn Power Off") is displayed on the monitor of the management console, and the power is switched OFF (728).

Figure 20:
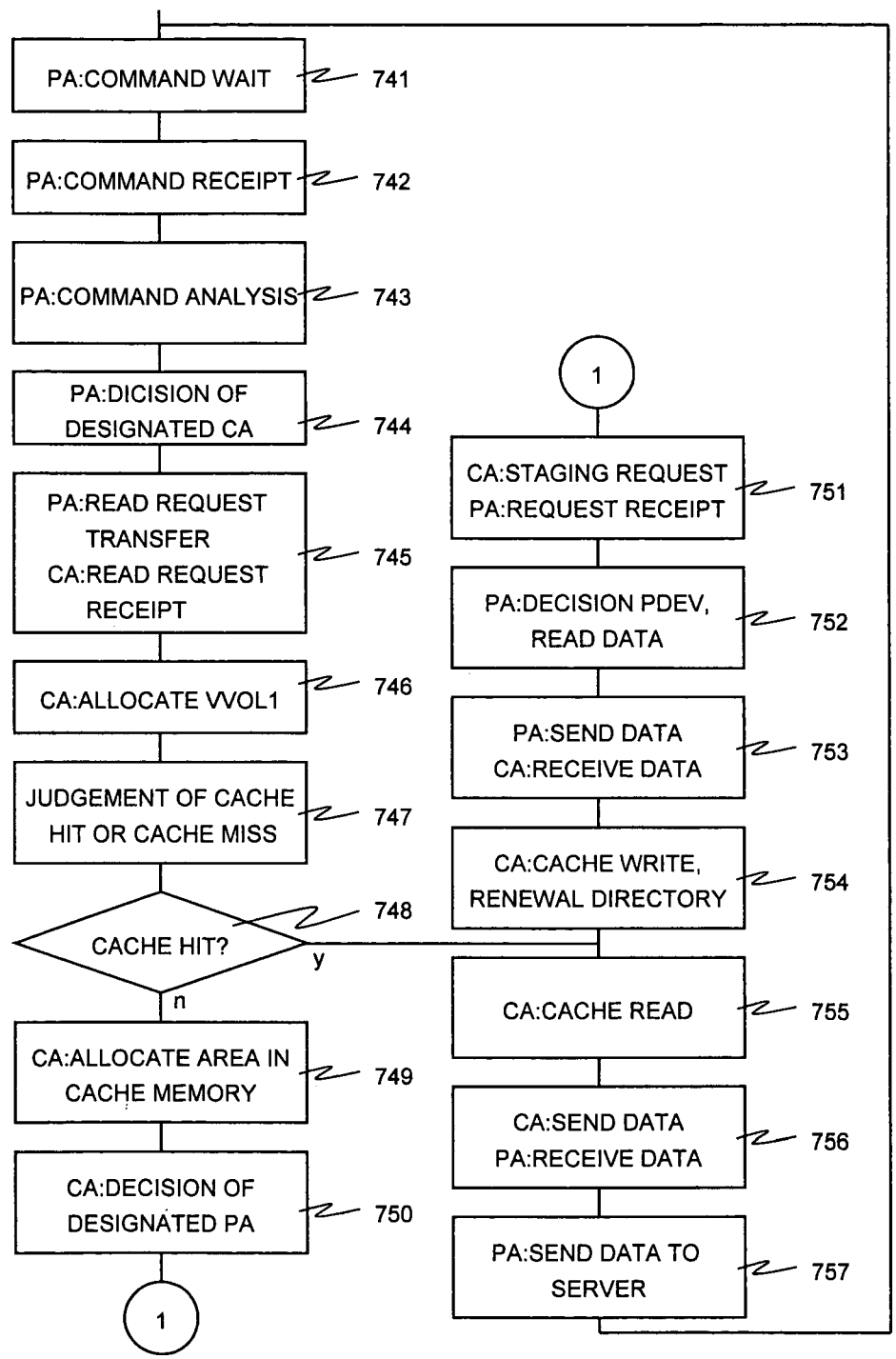
FIG. 20 is a flow chart showing an example of a case of reading data according to the first embodiment: of the present invention.

FIG. 20 is a flow chart showing an example of a case where data recorded in the storage system 1 is read from the servers 3.

First, the servers 3 issue a data read command with respect to the storage system 1.

When the external IFs 100 in the protocol transformation units 10 receive the data read command, the microprocessors 102 that have been "command wait" (741) read the command from the external IF 100, which received (742) and conduct command analysis (743). Logical units (also called "LUs" below), in which the data requested by the servers 3 is recorded, are allocated from the command analysis. The microprocessors 102 reference the management table for logical unit assignment 654 that was distributed from the system management unit 60 at the time of system initialization/alteration and which relates to the microprocessors' protocol transformation units 10, and decide data caching control units 21 managing the virtual volume configuring the LU in which the requested data is recorded (744).

Then, the microprocessors 102 issue a data read request from their own data transfer control units 105 through the interconnection to the data transfer control units 105 of the corresponding the thus data caching control units 21 (745). The microprocessors 101 in the data caching control units 21 receiving the read request access the control memory units 112, reference the management table for logical unit 653, the management table for virtual volume 652, and the management table for physical device 651, and allocate the virtual volume 1 number (VVOL1) 631 and address 641 in the virtual volume 1 (746). Next, the microprocessors 101 access the control memory units 112 and judge from the corresponding virtual volume 1 number 631 and the address 641 in the virtual volume 1 whether the requested data is in their cache memory units 111 (cache hit) or not (cache miss) (747).

In a case where the requested data is in their own cache memory units 111 (cache hit), the microprocessors 101 instruct their own data transfer control units 105 to read and transfer the requested data from the cache memory units 111 to the protocol transformation units 10 issuing the request (755). The own data transfer control units 105 transfer the requested data through the interconnection 31 to the data transfer control units 105 of the protocol transformation units 10 issuing the request (756). The data transfer control units 105 of the protocol transformation units 10 receiving the requested data send the data to the servers 3 through the external IF 100 (757).

In a case where the requested data is not in their own cache memory units 111 (cache miss), the microprocessors 101 allocate area in the cache memory units 111 in which to store the requested data (749). After the cache area allocation, the microprocessors 101 access the control memory units 112, reference the management table for physical device 651 and allocate the connection adapter number 610 (numbers of the protocol transformation units 10 to which the physical device (here, a hard drive) is connected) managing the physical device (also called "PDEV" below) configuring the requested virtual volume 1 (750).

Next, the microprocessors 101 read the requested data from their own data transfer control units 105 to the data transfer control units 105 of the corresponding protocol transformation units 10 and send control information instructing transfer to the data caching control units 21 (staging) (751). The microprocessors 102 of the corresponding protocol transformation units 10 receive this control information from their own data transfer control units 105, reference the copy of the management table for physical device 651 that was sent from the system management unit 60 at the time of initialization/alteration and which relates to themselves, determine the physical device (PDEV: hard drive) from which the data is to be read, and read the data from the corresponding hard drive (752). This data is transferred from the own data transfer control units 105 through the interconnection 31 to the data transfer control units 105 of the data caching control units 21 issuing the request (753). When their own data transfer control units 105 receive the requested data, the microprocessors 101 of the data caching control units 21 issuing the request write the data to the cache memory units 111 and renew the directories of the cache memories stored in the control memory units 112 (754). The operation flow thereafter is the same as from operation flow 755 in the case of a cache hit.

As described above, data is read from the hard drive with respect to a read request from the servers 3 and sent to the servers 3.

Figure 21:
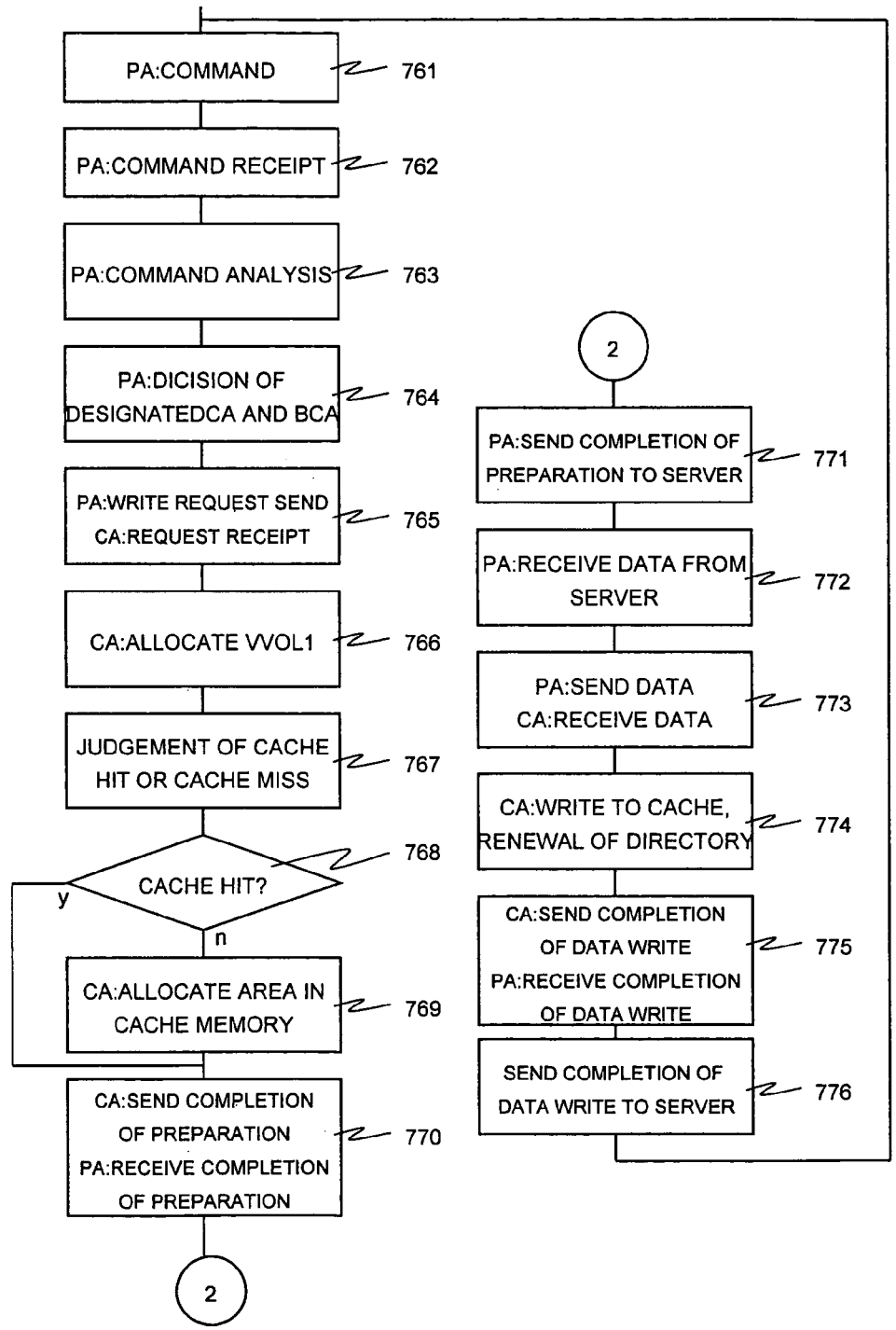
FIG. 21 is a flow chart showing an example of a case of writing data according to the first embodiment of the present invention.

FIG. 21 is a flow chart showing an example of a case where data is written from the servers 3 to the storage system 1.

First, the server 3 issues data write command with respect to the storage system 1.

When the external IFs 100 in the protocol transformation units 10 receive a data write command, the microprocessors 102 that have been waiting for a command (761) read the command from the external IF 100 which received (762) and conduct command analysis (763). The microprocessors 102 allocate logical units (LUs), in which the data requested by the servers 3 is recorded, from the command analysis. The microprocessors 102 reference the management table for logical unit assignment 654 that was distributed from the system management unit 60 at the time of system initialization/alteration and which relates to the microprocessors' protocol transformation units 10, and allocate data caching control units 21 managing the virtual volume configuring the LU in which the requested data is recorded (764).

Here, when the data caching control units 21 managing the virtual volume are doubled, the reliability of the storage system 1 can be improved. That is, the master data caching control units 21 managing the volume and backup-use data caching control units (also called "BCA" below) 21 are determined for each virtual volume, and data is written to both. Therefore, it becomes possible to continue the operation in the backup data caching control units 21 in a case where an error has occurred in the master data caching control units 21. In this case, in the processing of 764, the backup-use management data caching control units 21 are also described in the management table for logical unit assignment 654 and the numbers thereof are also allocated. Below, a case will be described where the backup-use management data caching control units 21 are determined.

The microprocessors 102 issue a data write request from their own data transfer control units 105 through the interconnection 31 to the data transfer control units 105 of the corresponding data caching control units 21 and the backup-use data caching control units 21 (765). The microprocessors 101 in the data caching control units 21 and the backup-use data caching control units 21 receiving the write request access the control memory units 112, reference the management table for logical unit 653, the management table for virtual volume 652, and the management table for physical device 651, and allocate the virtual volume 1 number 631 and address 641 in the virtual volume 1 (766). Next, the microprocessors 101 access the control memory units 112 and judge from the virtual volume 1 number 631 and the address 641 in the virtual volume 1 whether the data requested to be written is in their cache memory units 111 (cache hit) or not (cache miss) (767).

In a case where the requested data is in their own cache memory units 111 (cache hit), the microprocessors 101 notify the protocol transformation units 10 issuing the request of the completion of writing preparation (also called "writing preparation completion" below) through the data transfer control units 105 (770).

In a case where the requested data is not in their own cache memory units 111 (cache miss), the microprocessors 101 allocate in the cache memory units 111 a region in which to store the requested data (769), and thereafter send completion of preparation (770).

The microprocessors 102 of the protocol transformation units 10 receive the notification of completion of preparation and notify the servers 3 of completion of preparation through the external IF 100 (771). Thereafter, the protocol transformation units 10 receive, through the external IF 100, the data sent from the servers 3 that have received the notification of completion of data write (772). The microprocessors 102 instruct their own data transfer control units 105 to send the data to the data transfer control unit 105 of the corresponding data caching control units 21 and the backup-use data caching control units 21 (773). The microprocessors 101 of the data caching control units 21 and the backup-use data caching control units 21 receiving the data write the data in their own cache memory units 111 and update the directories of the cache memories in the control memory units 112 (774). When the writing of the data to the cache memory units 111 ends, the microprocessors 101 of the data caching control units 21 and the backup-use data caching control units 21 send a completion of data write notification through the data transfer control units 105 to the protocol transformation units 10 issuing the request (775). The microprocessors 101 of the protocol transformation units 10 receiving the completion of data write notification send the completion of data write notification to the servers 3 through the external IF 100. As for the data written to the cache memory units 111, the microprocessors 101 of the master data caching control units 21 determine the vacant capacity of the cache memory units 111 and write, asynchronously from the write request from the servers 3 and through the protocol transformation units 10 to which the hard drive is connected, the data to the hard drive including the volume in which the data is recorded (776).

Thus, the writing operation is conducted on the hard drive with respect to the write request from the servers 3.

Figure 22:
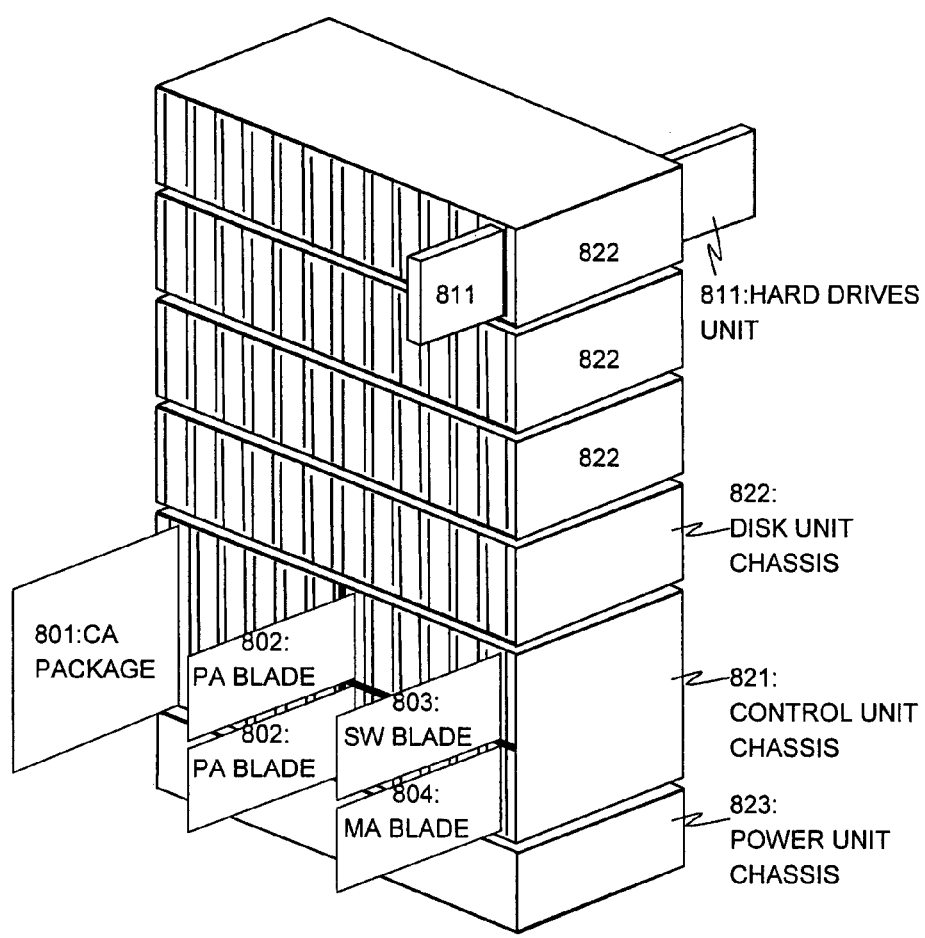
FIG. 22 is an explanatory diagram showing an example configuration in which the storage system 1 according to the first embodiment of the present invention is mounted in a casing.

FIG. 22 shows an example configuration in which the storage system 1 according to the first embodiment is mounted in a casing.

In FIG. 22, the PA 10, the CA 21, the MA 60, the switch units 51, and the switch units 52 are respectively implemented as a package, and mounted in a control unit chassis 821 as a PA blade 802, a CA package 801, an MA blade 804, and an SW blade 803, respectively. A back plane (not shown) is provided to a back surface of the control unit chassis 821, and each of the package and blades is connected to the back plane through connectors. The back plane has wirings formed thereon, whereby the package and blades are connected to one another in such a connection configuration as shown in FIG. 2.

Compared to the protocol transformation unit 10 and the system management unit 60, the data caching control unit 21 is larger in the number of mounted processors and memory capacity, so that the CA package 801 has an area twice as large as the other blades. Also, the package and blades use a general-purpose/dedicated blade server, on which dedicated software is executed.

Provided above the control unit chassis 821 are four disk unit chassis 822 mounted with a hard drive unit 811 including hard drives. Provided below the control unit chassis 821 is a power unit chassis 823 receiving a power unit that supplies power to the entire storage system 1.

Those disk unit chassis 822, the control unit chassis 821, and the power unit chassis 823 are received in a 19-inch rack (not shown).]

It should be noted that the storage system 1 may adopt a hardware configuration having no hard drive group. In that case, the hard drive group existing at a location separate from the storage system 1 is connected to the storage system 1 through the PA 10.

In the storage system according to the first embodiment of the present invention having the above configuration, the access load on the cache memory units and the control memory units is reduced because control of the cache memories is conducted independently for each control cluster. Also, inter-processor communication process that has been necessary in the prior art shown in FIG. 36 is reduced because control of the cache memories and data transfer between the servers and the hard drives are consolidated and conducted by the microprocessors in the data caching control units. Thus, it becomes possible to improve the performance of the entire storage system 1.

Also, it becomes possible to operate the storage system per control cluster because control of the cache memories is conducted independently for each control cluster. Thus, the cost of the system can be optimized per control cluster, it becomes possible to provide a system of a small-scale configuration at a low cost, and it becomes possible to provide a system at a cost that meets the system scale.

Thus, it becomes possible to provide a storage system with a cost/performance meeting the system scale, from a small-scale to a large-scale configuration.

SECOND EMBODIMENT

Next, description will be made of a second embodiment of the present invention.

Figure 23:
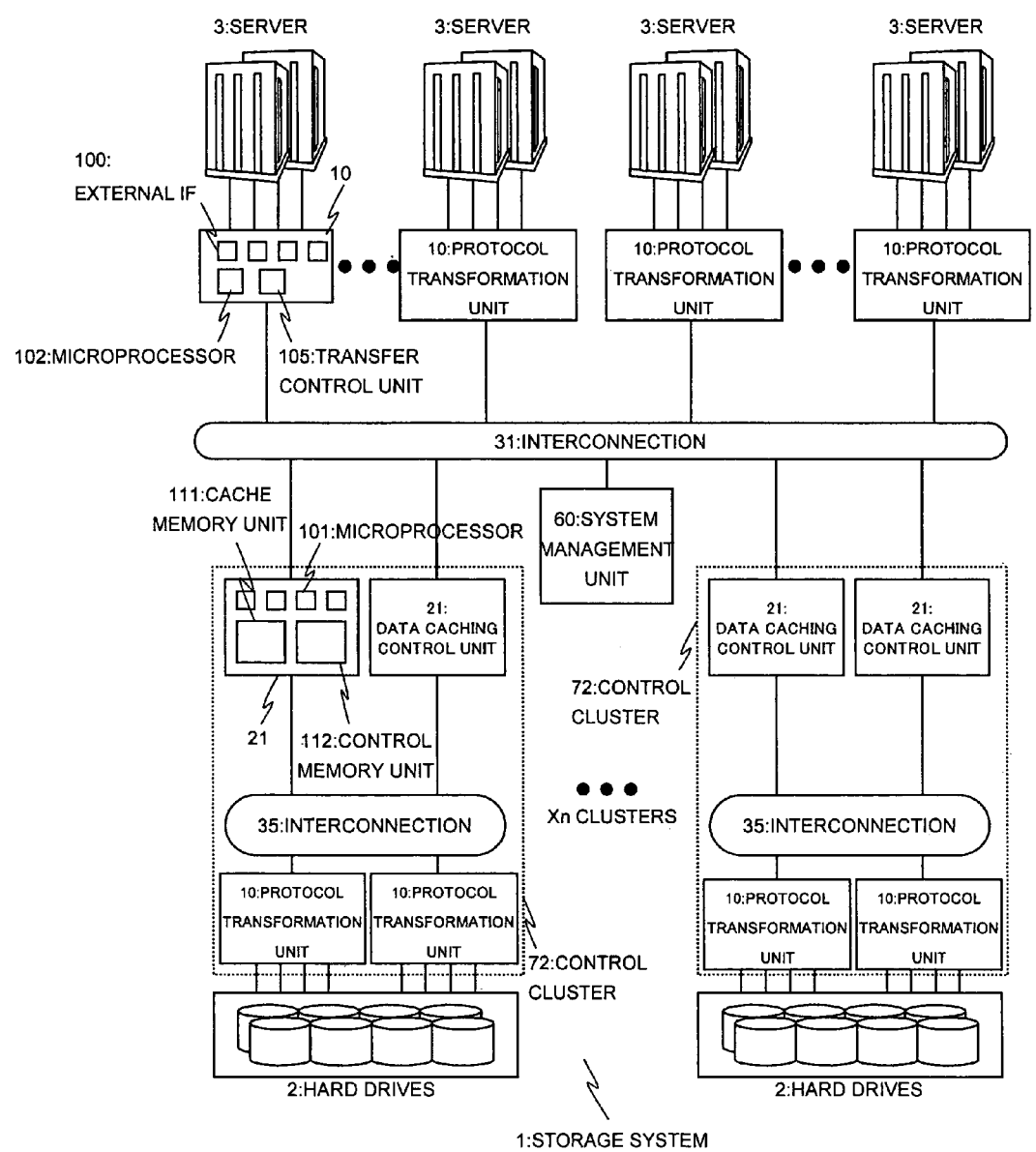
FIG. 23 is a block diagram showing a configuration of the storage system according to the second embodiment of the present invention.

FIG. 23 is a block diagram showing a configuration of the second embodiment of the present invention.

In FIG. 23, the configuration of the storage system 1 is the same as the configuration shown of the first embodiment shown in FIG. 2, except that the interconnection 31 connecting the data caching control units 21 and the protocol transformation units 10 to which the servers 3 are connected and interconnections 35 connecting the data caching control units 21 and the protocol transformation units 10 to which the hard drives 2 are connected are physically independent.

The interconnection 31 and the interconnections 35 are physically independent and are not directly connected.

Figure 24:
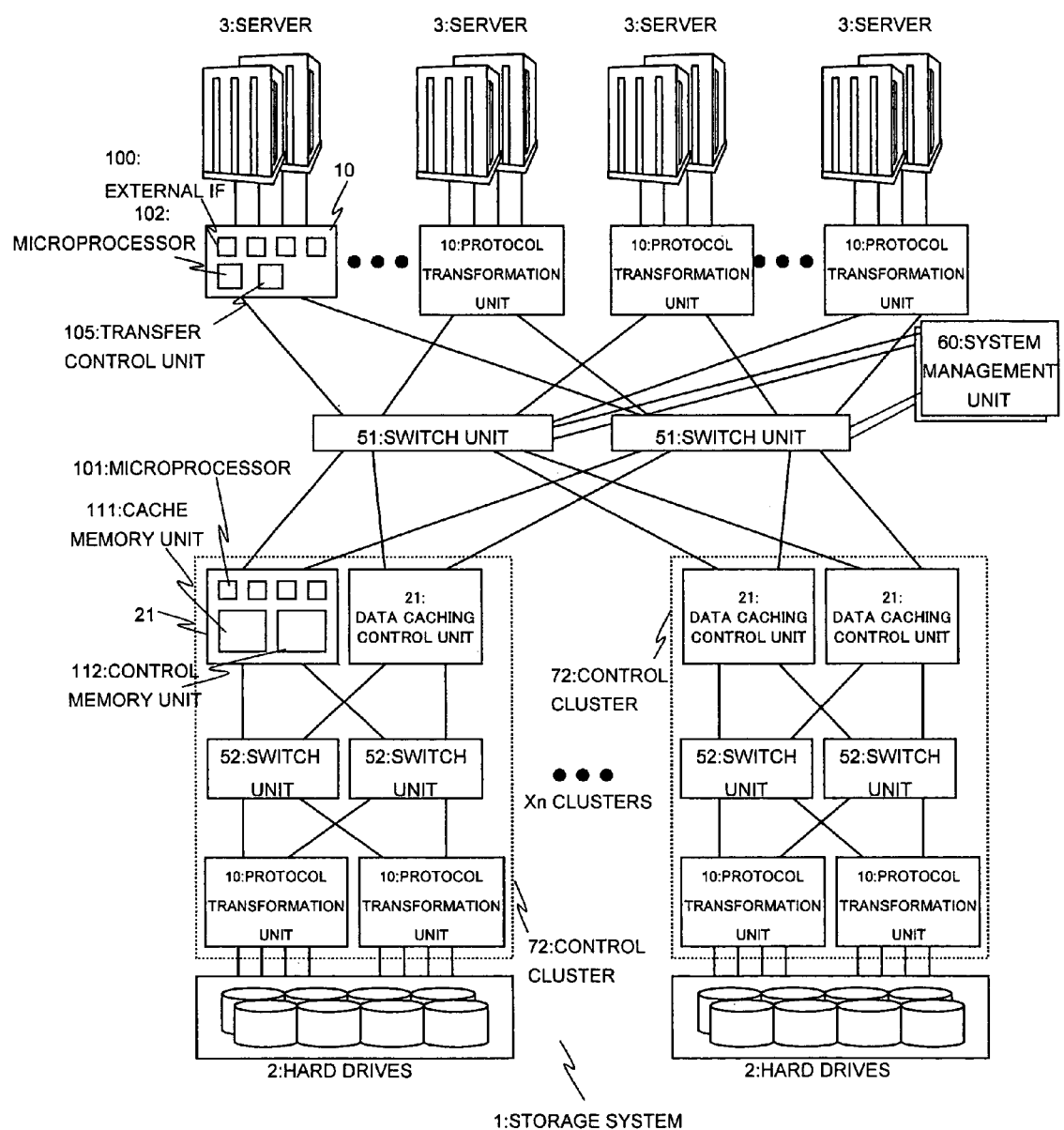
FIG. 24 is a block diagram showing a specific example configuration of the interconnection 31 according to the second embodiment of the present invention.

FIG. 24 shows an example of a case where the interconnection 31 and the interconnections 35 are respectively configured by switch units 51 and switch units 52. The switch units 52 have a configuration where the total number of path IFs is four with respect to the switch units 51 shown in FIG. 3.

By configuring the system in this manner, there is the potential for costs to rise as a result of preparing two independent interconnections, but data transfer between the data caching control units 21 and the protocol transformation units 10 to which the servers 3 are connected and data transfer between the data caching control units 21 and the protocol transformation units 10 to which the hard drives 2 are connected no longer interfere with one another as in the configuration of the first embodiment. Also, the performance of the storage system 1 is improved because it becomes possible to configure interconnections of a specification matching the performance demanded of the respective data transfers.

In the configuration of the second embodiment, effects that are the same as those of the first embodiment are obtained without problem, and it becomes possible to provide a storage system with a cost/performance meeting the system scale, from a small-scale to a large-scale configuration.

Figure 25:
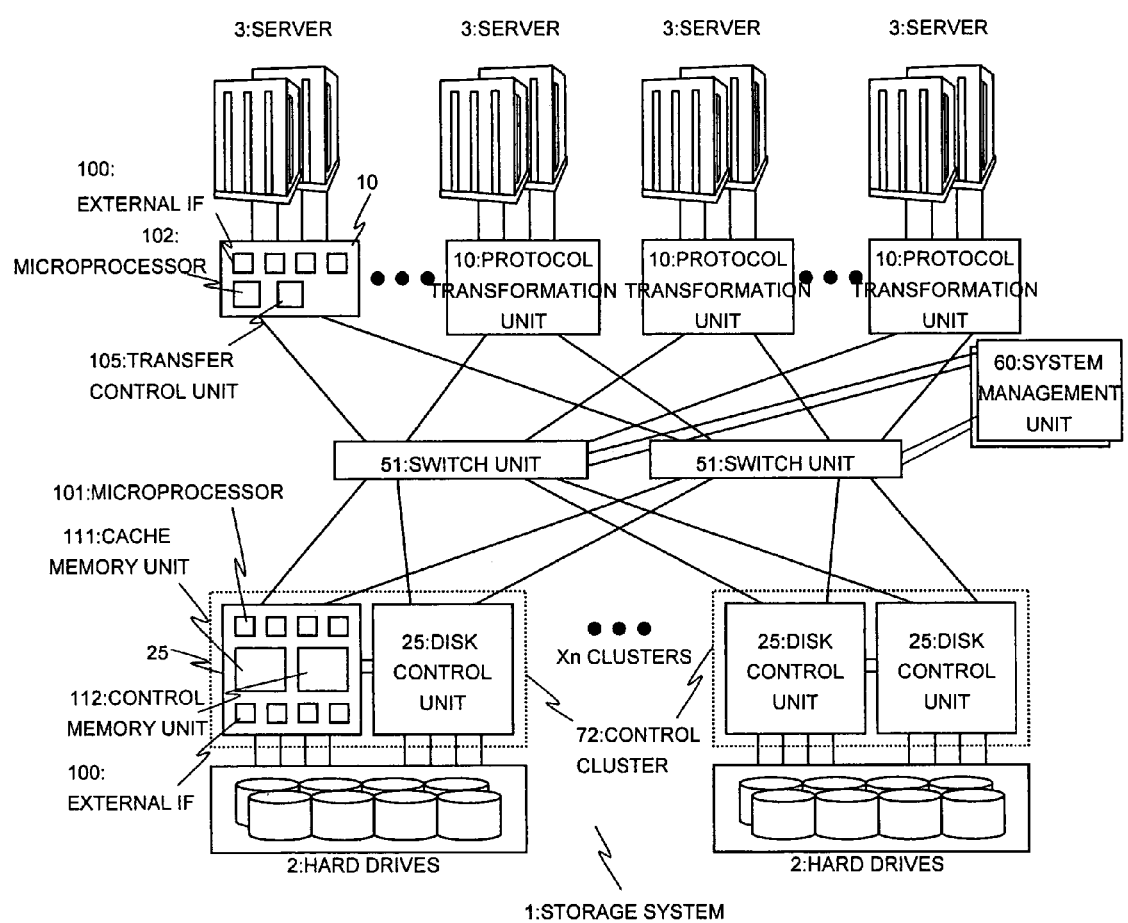
FIG. 25 is a block diagram showing a configuration of the storage system according to a fourth modified example of the second embodiment of the present invention.

As shown in FIG. 25, the present invention is implemented without problem even if the data caching control units 21 and the protocol transformation units 10 are consolidated as a single control unit in a disk control unit 25 and mounted on the same circuit board.

Figure 26:
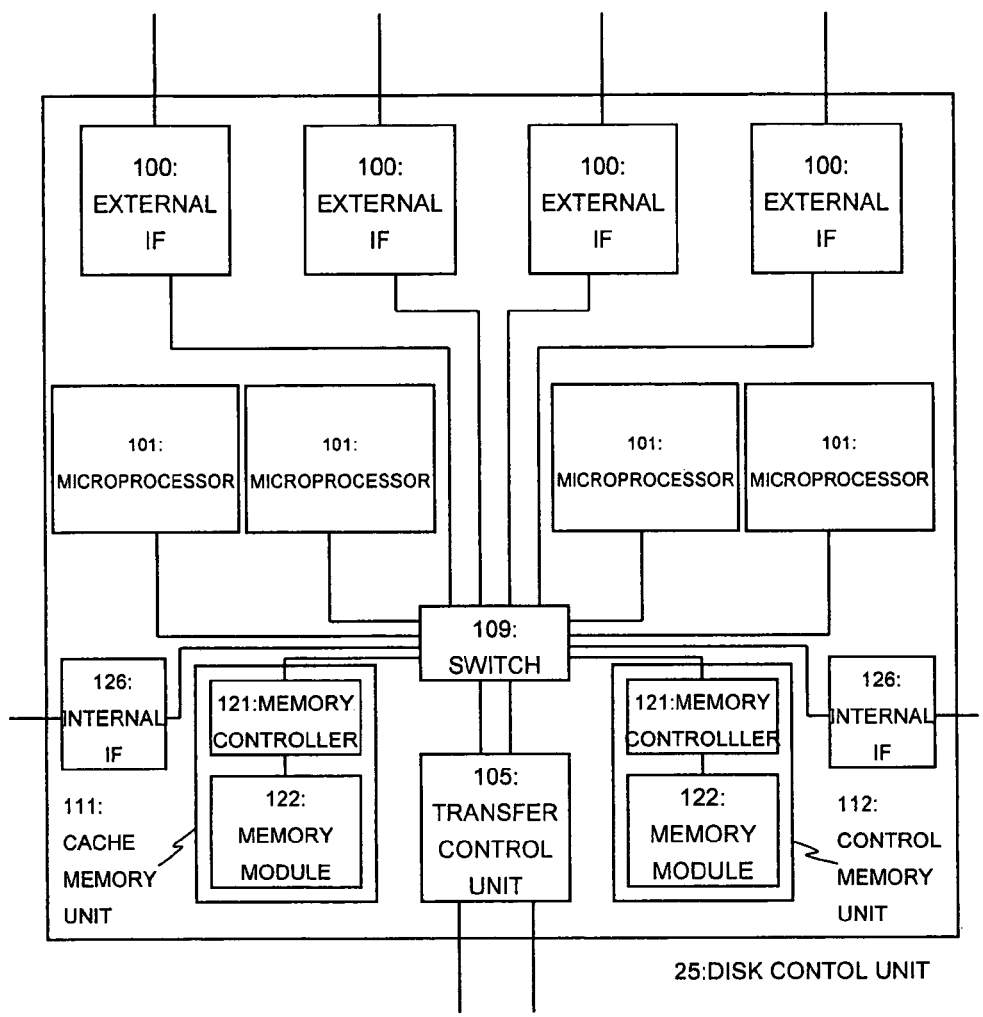
FIG. 26 is a block diagram showing a specific example of a disk control unit 25 according to the second embodiment of the present invention.

FIG. 26 is a block diagram showing a specific example of the disk control unit 25 according to the second embodiment.

The disk control unit 25 includes at least four microprocessors 101, a data transfer control unit 105 that controls transfer of data/control information with the protocol transformation units 10 or the system management unit 60, four IFs (external IFs) 100 with the hard drives 2, a cache memory unit 111 that temporarily stores data exchanged with the servers 3 or the hard drives 2, and a control memory unit 112 that stores control information relating to the data transfer, the management of the cache memory unit 111, and management of the hard drives 2.

It should be noted that the disk control unit 25 may be configured to connect with not only the hard drives 2 but also other nodes such as the server 3 and the storage system 4. In that case, the external IFs 100 are provided thereto for conducting protocol conversion with respect to the other nodes, and function as channel control units.

Each of the cache memory unit 111 and the control memory unit 112 is configured from a memory module 122 and a memory controller 121 that controls access to the memory module 122. Here, there is no problem if the cache memory unit 111 and the control memory unit 112 each have the same memory controller 121 and memory module 122 and if a cache memory region and a control memory region are allocated to different regions on a single memory space. Also, each microprocessor includes a memory (not shown) connected to itself as a main memory. Alternatively, there is no problem if the four microprocessors have an SMP configuration where they share the cache memory unit 111 and the control memory unit 112 as their own main memory.

The microprocessors 101, the cache memory unit 111, the control memory unit 112, the external IF 100, and the data transfer control unit 105 are connected through a switch 109. The microprocessors 101 use control information stored in the control memory unit to control the reading/writing of data to the cache memory, directory management of the cache memory, data transfer with the protocol transformation units 10 and the hard drives 2, and the exchange of system management information with the system management unit 60. The microprocessors 101 also execute so-called RAID processing, or redundant processing of data written to the hard drives 2 connected to the protocol transformation units 10.

Here, the connection configuration among the microprocessors 101, the cache memory unit 111, the control memory unit 112, the external IF 100, and the data transfer control unit 105 is merely given as an example, and the connection configuration is not intended to be limited thereto. There is no problem as long as the connection configuration allows the microprocessors 101 to control the cache memory unit 111, the control memory unit 112, the external IF 100, and the data transfer control unit 105.

Also, as shown in FIG. 25, because communication of data and control information is conducted by the connection paths connecting the two disk control units 25 configuring the control cluster, two internal IFs 126 are connected to the switch 109. By interconnecting the internal IFs 126 of the two disk control units 25 with connection paths, communication of data and control information is conducted through the connection paths. For example, doubling of information stored in the cache memory units 111 or the control memory units 112 of the two disk control units 25 is conducted through the connection paths. Thus, in a case where an error arises in one of the two disk control units 25 configuring the control cluster 72, reliability of the storage system is improved because it becomes possible to continue the operation of the storage system with the other disk control unit.

As described above, in the second embodiment of the present invention, by using the data caching control units 21 and the protocol transformation units 10 as a single control unit, consolidating them in the disk control units 25 and mounting them on a single board, it becomes unnecessary for the data caching control units 21 and the protocol transformation units 10 to communicate with the switch unit 52, so that data transfer performance is improved. Also, it becomes possible to reduce the cost of the storage system because the number of parts configuring the control clusters 72 is reduced.

THIRD EMBODIMENT

Next, description will be made of a third embodiment of the present invention.

Figure 27:
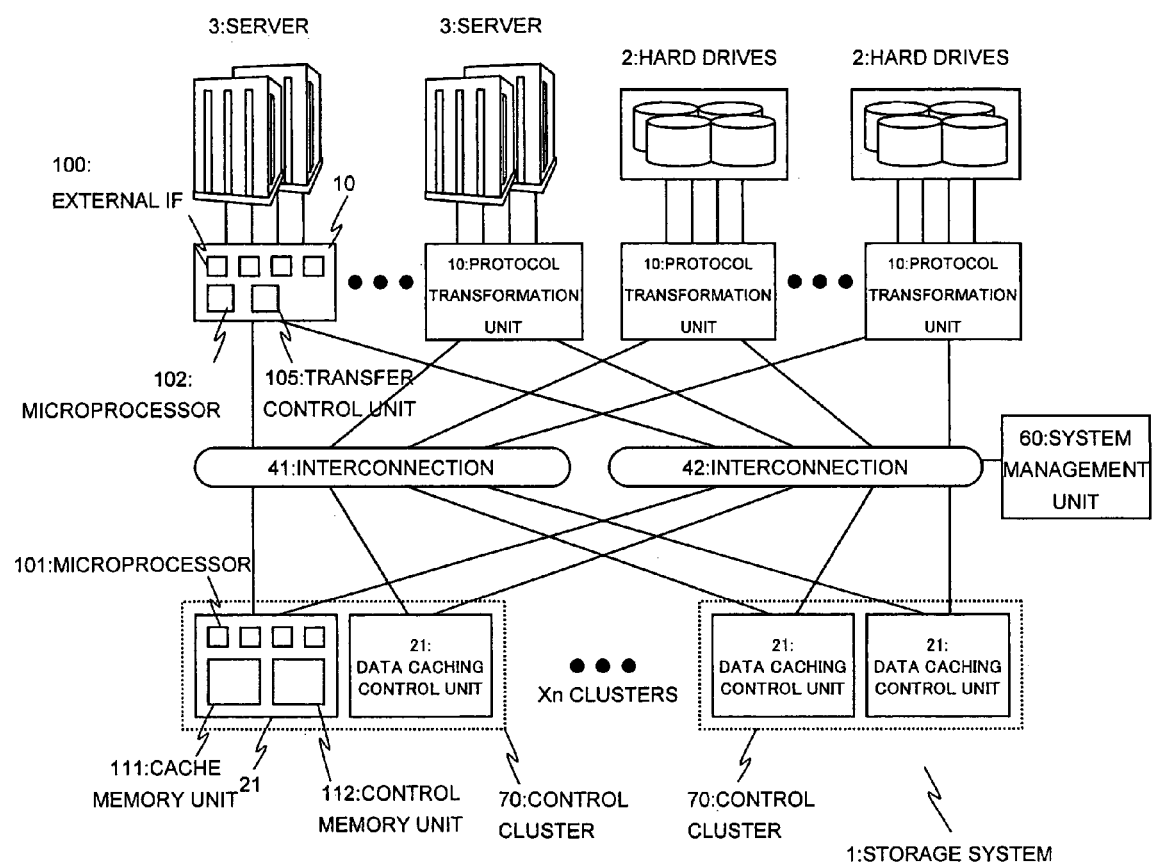
FIG. 27 is a block diagram showing the storage system according to the third embodiment of the present invention.

FIG. 27 is a block diagram showing the third embodiment of the present invention.

In FIG. 27, the configuration of the storage system 1 is the same as the configuration of the first embodiment shown in FIG. 1, except that the interconnection 31 is divided into an interconnection 41 and an interconnection 42, and the system management unit 60 is connected to the interconnection 42.

The interconnection 41 is an interconnection dedicated to data transfer, and the interconnection 42 is an interconnection dedicated to the transfer of control information. Thus, the system management unit 60 conducting management of the storage system 1 is connected to the interconnection 42.

By configuring the system in this manner, according to the third embodiment of the present invention, data transfer and transfer of control information no longer interfere with each other. Also, the performance of the storage system 1 is improved because it becomes possible to configure interconnections of a specification matching the performance demanded of the respective transfers.

The present invention is implemented without problem even if the configuration of the third embodiment is applied to the configuration of the first embodiment shown in FIG. 8 or the configuration of the second embodiment shown in FIG. 23.

In the configuration of this embodiment, effects that are the same as those of the first embodiment are obtained without problem, and it becomes possible to provide a storage system with a cost/performance meeting the system scale, from a small-scale to a large-scale configuration.

FOURTH EMBODIMENT

Next, description will be made of a fourth embodiment of the present invention.

In the first embodiment of the present invention, a system where the management of the cache memory units 111 was closed inside the control clusters 70 and 71 was described with respect to the storage system 1 of the configuration shown in FIGS. 1 and 8. That is, the microprocessors 101 in the data caching control units 21 within a given control cluster 70 or 71 managed only the cache memory units 111 and the control memory units 112 within that control cluster 70 or 71 and did not manage the cache memory units 111 and the control memory units 112 within another control cluster 70 or 71.

In the fourth embodiment, a control method will be described where the cache memory units 111 and the control memory units 112 physically divided in the plural control clusters 70 and 71 shown in FIGS. 1 and 8 are controlled by the entire storage system 1 as a single memory address space, whereby the plural cache memory units and the control memory units 112 are respectively logically shared by the microprocessors 101 and 102 of the entire storage system 1.

Here, what is meant by the plural cache memory units 111 and the control memory units 112 being respectively logically shared by the microprocessors 101 and 102 of the entire storage system 1 is that a global address clearly specified in the system is physically allocated to plural memory units and each processor has that global address map, whereby all of the microprocessors 101 and 102 can access data or control information stored in whichever cache memory unit 111 or control memory unit 112.

The management configuration of the entire storage system is the same as the configuration shown in FIG. 11. Here, the logical unit allocation table 654 showing the corresponding relation between the LU provided to the user and the data caching control units 21 managing the virtual volume configuring the LU is stored in the memory of the system management unit 60.

In the first embodiment, a copy of portions of the management table for logical unit assignment 654 relating to the protocol transformation units 10 was sent to the corresponding protocol transformation units 10, and the protocol transformation units 10 stored this in the memories connected to the microprocessors 102. However, in the fourth embodiment, distribution of the copy is not conducted. Together therewith, with respect to the operation flow at the time of system initialization shown in FIG. 18, distribution processing of the copy of the management table for logical unit assignment 654 to the protocol transformation units 10 in the processing of step 709 is eliminated.

Here, in this embodiment, an example of a case where data recorded in the storage system 1 is read from the servers 3 will be described.

First, the servers 3 issue a data read command with respect to the storage system 1. Here, command analysis processing is the same as that in the method of the first embodiment described in FIG. 20. The method of request destination CA determination processing (744) thereafter is different. That is, the microprocessors 102 access the system management unit 60, reference the management table for logical unit assignment 654 relating to their own protocol transformation units 10, and allocate the data caching control units 21 managing the virtual volume configuring the LU in which the requested data is recorded (744). Processing thereafter (745 to 757) is the same as that of the first embodiment described in FIG. 20.

Next, an example of a case where data is written from the servers 3 to the storage system 1 will be described. First, the servers 3 issues a data write command with respect to the storage system 1. Here, command analysis processing is the same as that in the method of the first embodiment described in FIG. 21. The method of request destination CA determination processing (764) thereafter is different. That is, the microprocessors 102 access the system management unit 60, reference the management table for logical unit assignment 654 relating to their own protocol transformation units 10, and allocate the data caching control units 21 managing the virtual volume configuring the LU in which the requested data is recorded (764). Processing thereafter (765 to 776) is the same as that in the method of the first embodiment described in FIG. 21.

In the above description, the system management unit 60 was accessed each time at the time of data reading or writing and the data caching control units 21 managing the virtual volume configuring the LU to become the target of reading or writing were allocated. However, the present invention is implemented without problem even if the management table for logical unit assignment 654 of the entire storage system is stored in all of the control memory units 112 of the data caching control units 21. In this case, the method of request destination CA determination processing (744, 764) shown in FIGS. 20 and 21 is different.

That is, each protocol transformation unit 10 predetermines the data caching control units 21 sending the data read/write request due to setting from the management terminal at the time of system initialization. At this time, the number of protocol transformation units 10 allocated to the data caching control units 21 is set by the data caching control units 21 to become as equal as possible. Therefore, the access load on each data caching control unit 21 can be made equal. In the request destination CA determination processing (744, 764), the microprocessors 102 access the predetermined data caching control units 21, reference the management table for logical unit assignment 654 relating to their own protocol transformation units 10, and allocate the data caching control units 21 managing the virtual volume configuring the LU in which the requested data is recorded. The rest of the sequence is the same as the sequence described in FIGS. 20 and 21.

The present invention is implemented without problem even if, after command reception (742, 762) in the processing of FIGS. 20 and 21, the command is transferred to the microprocessors 101 of the data caching control units 21 and command analysis (743, 763) is conducted by the microprocessors 101. In this case, in the request destination CA determination processing (744, 764), the microprocessors 101 reference the management table for logical unit assignment 654 stored in the control memory units 112, and allocate the data caching control units 21 managing the virtual volume configuring the LU in which the requested data is recorded. In a case where the corresponding data caching control units 21 are not the data caching control units 21 to which the microprocessors 101 receiving the command belong, the microprocessors 101 access the cache memory units 111 and the control memory units 112 in the corresponding data caching control units 21 and conduct processing from 745 or 765 on.

Alternatively, the command is transferred to the microprocessors 101 in the corresponding data caching control units 21 and processing from 745 or 765 on is conducted by the microprocessors 101 in the corresponding data caching control units 21, the cache memory units 111, and the control memory units 112.

Thus, according to the fourth embodiment of the present invention, it becomes unnecessary to dispose the microprocessors 102 in the protocol transformation units 10.

The present invention is implemented without problem even if the control method of the fourth embodiment is applied to the configuration of the first embodiment shown in FIGS. 2 and 9, the configuration of the second embodiment shown in FIGS. 24 and 25, or the configuration of the third embodiment shown in FIG. 27.

In the configuration of the fourth embodiment, effects that are the same as those of the first embodiment are obtained without problem, and it becomes possible to provide a storage system with a cost/performance meeting the system scale, from a small-scale to a large-scale configuration.

FIFTH EMBODIMENT

Next, description will be made of a fifth embodiment of the present invention.

Figure 28:
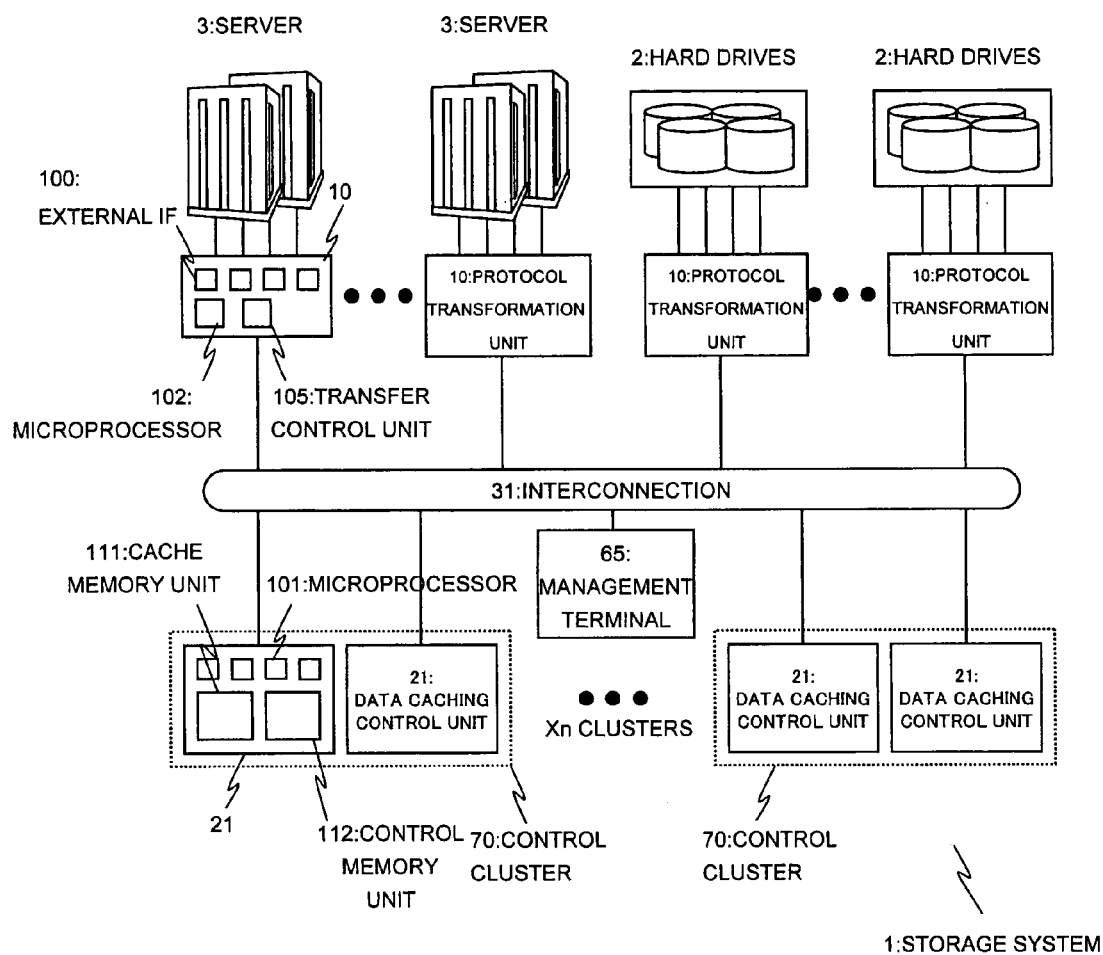
FIG. 28 is a block diagram showing the storage system according to a fifth embodiment of the present invention.
Figure 29:
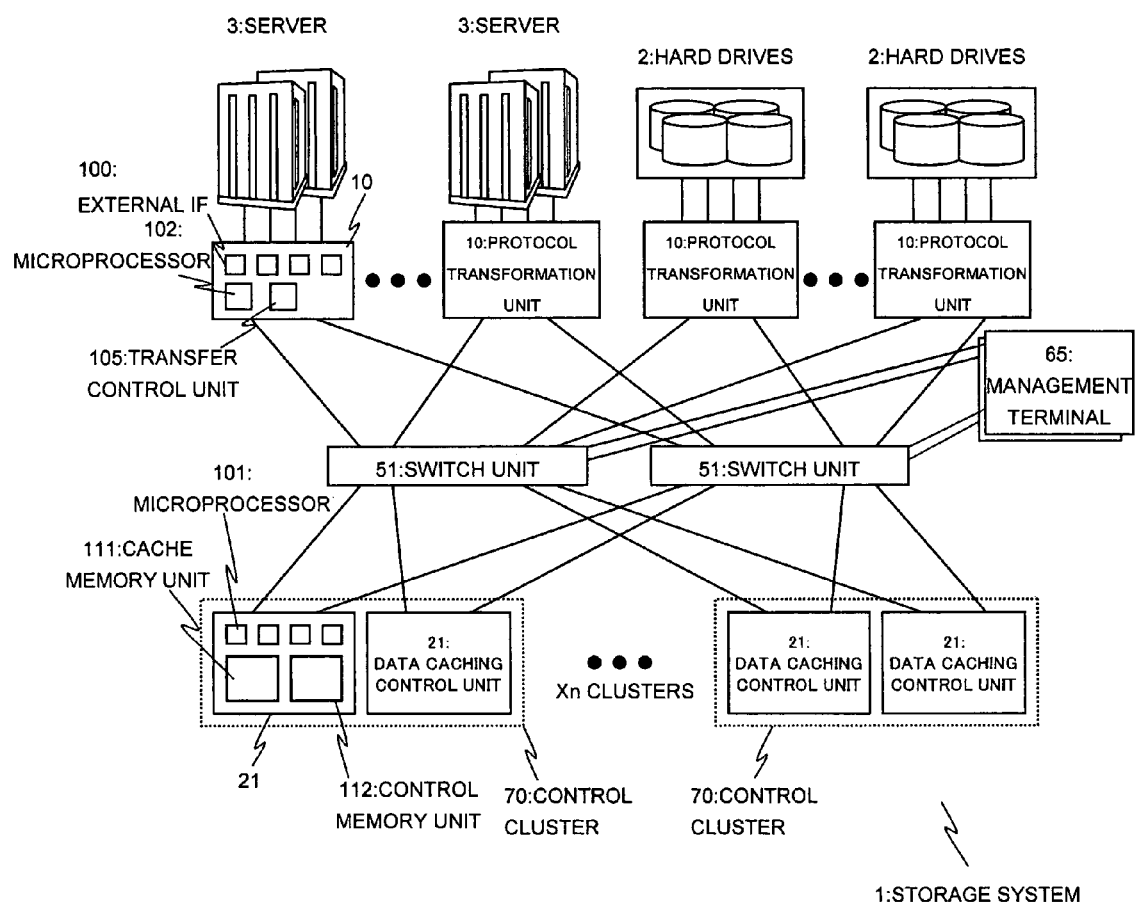
FIG. 29 is a block diagram showing a specific example configuration of the interconnection 31 according to the fifth embodiment of the present invention.

FIGS. 28 and 29 are block diagrams showing a storage system according to the fifth embodiment of the present invention.

As shown in the drawings, the storage system 1 has the same configuration as that of the first embodiment shown in FIGS. 1 and 2, except that there is no system management unit 60.

In the fifth embodiment, similarly to the fourth embodiment, the cache memory units 111 and the control memory units 112 physically divided in the plural control clusters 70 are controlled by the entire storage system 1 as a single memory address space. Thus, the plural cache memory units 111 and the control memory units 112 are respectively logically shared by the microprocessors 101 and 102 of the entire storage system 1.

The management table for physical device 651, the management table for virtual volume 652, the management table for logical unit 653, and the management table for logical unit assignment 654 that were created in the system management unit 60 and stored in the memory thereof in the first embodiment are created by a management terminal connected to each processor by a dedicated network such as a Local Area Network (LAN) or the interconnection 31, and a copy of portions relating to each protocol transformation unit 10 and data caching control unit 21 is respectively stored in the memory in the corresponding protocol transformation units 10 and data caching control units 21.

In a case where the management tables are stored in the memories in this manner, the sequence of the reading and writing of data becomes the same as the sequence shown in FIGS. 20 and 21.

Also, the management table for logical unit assignment 654 of the entire system may be stored in all the control memory units 112 of the data caching control units 21. In this case, the method of request destination CA determination processing (744, 764) shown in FIGS. 20 and 21 is different. That is, each protocol transformation unit 10 predetermines the data caching control units 21 sending the data read/write request due to setting from the management terminal at the time of system initialization. At this time, the number of protocol transformation units 10 allocated to the data caching control units 21 is set by the data caching control units 21 to become as equal as possible.

Therefore, the access load on each data caching control unit 21 can be made equal. In the request destination CA determination processing (744, 764), the microprocessors 102 access the predetermined data caching control units 21, reference the management table for logical unit assignment 654 relating to their own protocol transformation units 10, and allocate the data caching control units 21 managing the virtual volume configuring the LU in which the requested data is recorded. The rest of the sequence is the same as the sequence described in connection with FIGS. 20 and 21.

The present invention is implemented without problem even if, after command reception (742, 762) in the processing of FIGS. 20 and 21, the command is transferred to the microprocessors 101 of the data caching control units 21 and command analysis (743, 763) is conducted by the microprocessors 101. In this case, in the request destination CA determination processing (744, 764), the microprocessors 101 reference the management table for logical unit assignment 654 stored in the control memory units 112, and allocate the data caching control units 21 managing the virtual volume configuring the LU in which the requested data is recorded. In a case where the corresponding data caching control units 21 are not the data caching control units 21 to which the microprocessors 101 receiving the command belong, the microprocessors 101 access the cache memory units 111 and the control memory units 112 in the corresponding data caching control units 21 and conduct processing from 745 or 765 on.

Alternatively, the command is transferred to the microprocessors 101 in the corresponding data caching control units 21 and processing from 745 or 765 on is conducted by the microprocessors 101 in the corresponding data caching control units 21, the cache memory units 111, and the control memory units 112.

Thus, according to the fifth embodiment of the present invention, it becomes unnecessary to dispose the microprocessors 102 in the protocol transformation units 10. In the configuration of this embodiment, effects that are the same as those of the first embodiment are obtained without problem, and it becomes possible to provide a storage system with a cost/performance meeting the system scale, from a small-scale to a large-scale configuration.

SIXTH EMBODIMENT

Described next is a storage system according to a sixth embodiment of the present invention.

Figure 30:
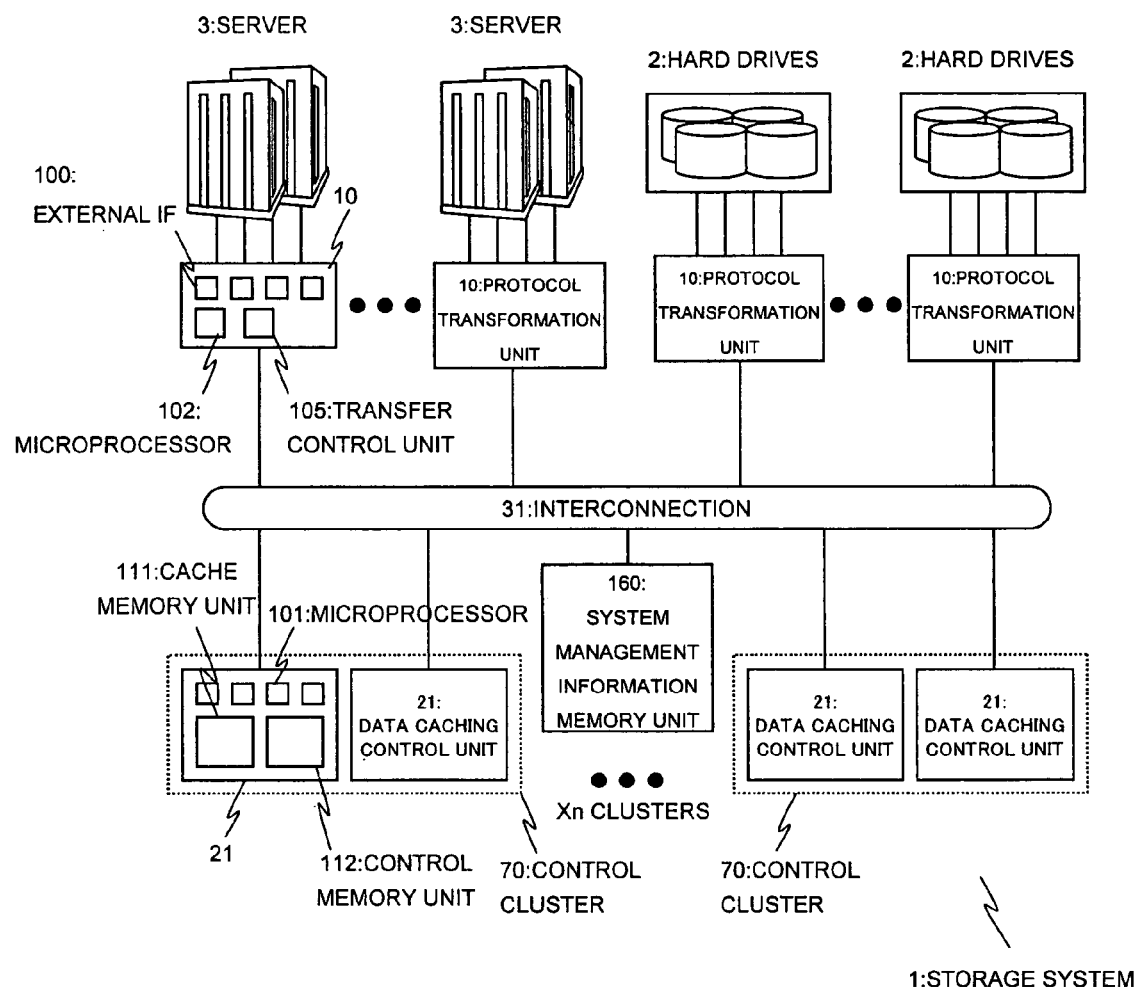
FIG. 30 is a block diagram showing a configuration of the storage system according to a sixth embodiment of the present invention.

FIG. 30 is a block diagram showing the configuration of the storage system according to the sixth embodiment. FIG. 30 is similar to FIG. 1 of the first embodiment, and the only difference between the two is that FIG. 30 has a system management information memory unit 160 in place of the system management unit 60 of FIG. 1. Components in FIG. 30 that function the same way as those in the first through fifth embodiments are denoted by the same reference numerals, and description on such components is omitted here.

The system management unit 60 manages, as described in the first embodiment, information about the configuration of the storage system 1 and the like. In this embodiment, the system management information memory unit 160 stores management information about the configuration of the storage system 1 and managing the storage system 1 based on the stored management information is not the job of the system management information memory unit 160 but of the microprocessors 101 in one of the data caching control units 21.

Figure 31:
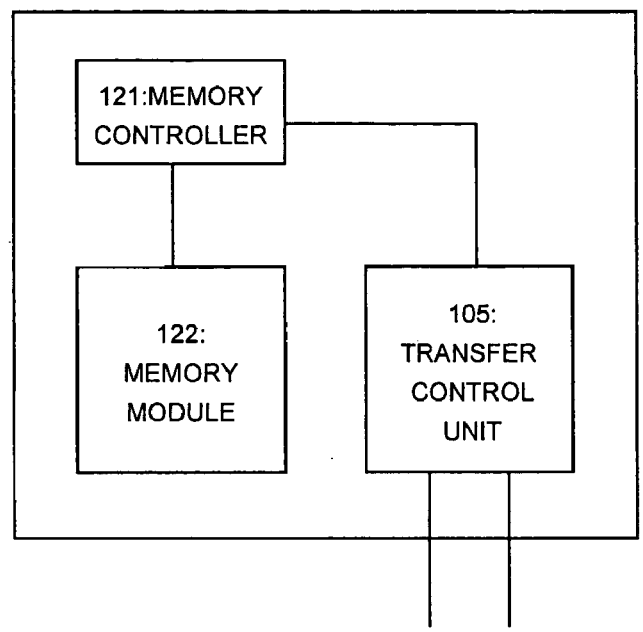
FIG. 31 is a block diagram showing a specific example configuration of a system management information memory unit 160 according to the sixth embodiment of the present invention.

FIG. 31 is a block diagram showing a specific configuration example of the system management information memory unit 160.

The system management information memory unit 160 includes the data transfer control unit 105, the memory controller 121, and the memory module 122.

The storage system of this embodiment is set such that the microprocessors 101 in one of the data caching control units 21 of one of the control clusters 70 take over the processing conducted by the microprocessor 101 of the system management unit 60 in the preceding embodiments. Management information of the storage system is stored in the system management information memory unit 160. Which microprocessors 101 are to manage the system is determined in advance through a management console connected to one of the data caching control units 21 that has the microprocessors 101 chosen.

The thus selected microprocessors 101 conduct processing identical to the above-described processing handled by the system management unit 60. To be specific, the microprocessors 101 that have been assigned to manage the storage system 1 obtain management information of the entire storage system 1 by organizing management information. That is collected through the protocol transformation units 10 and the data caching control units 21, management information of the interconnection 31, information set by a user on a management console that is connected via the interconnection 31, and other information. The organized management information is stored in the memory module 122 of the system management information memory unit 160, and is used by the microprocessors 101 in question to manage the storage system 1.

For instance, in the management configuration shown in FIG. 11, the storage management unit 501, the logical path management unit 502, and the network management unit 503 are executed as software programs in the microprocessors 101 that have been assigned to manage the system. More specifically, the microprocessors 101 that have been assigned to manage the system execute the system startup processing (FIG. 18), the system shutdown processing (FIG. 19), and other processing of the first embodiment.

In the thus structured storage system of the sixth embodiment, the microprocessors 101 in one of the data caching control units 21 of one of the control clusters manage the entire storage system configuration. Management information, that necessary to manage the system is stored in a memory provided in the system management information memory unit 160. In this case, the need to provide the storage system 1 with the system management unit 60 which has the microprocessor 101 is eliminated and the overall cost of the storage system can accordingly be reduced.

Further, the interconnection 31 may be divided into the interconnection 41 dedicated to data transfer and the interconnection 42 dedicated to transfer of control information as in the third embodiment (FIG. 27). In this case, data transfer and transfer of control information are prevented from interfering each other. In addition, performance of the storage system 1 can be improved since each interconnection can be structured to meet qualifications for the respective transfer types best.

It is also possible to omit the system management information memory unit 160 as in the fifth embodiment (FIGS. 28 and 29). In this case, the microprocessors 101 that have been assigned to manage the entire storage system 1 logically share the cache memory units 111 and the control memory units 112, and a management table is created in the microprocessors 101 to manage the system. Therefore, the thus structured storage system makes it possible to provide a storage system that cost and performance match the system scale whether it is a small-scale system or a large-scale system.

SEVENTH EMBODIMENT

Described next is a storage system according to a seventh embodiment of the present invention.

Figure 32:
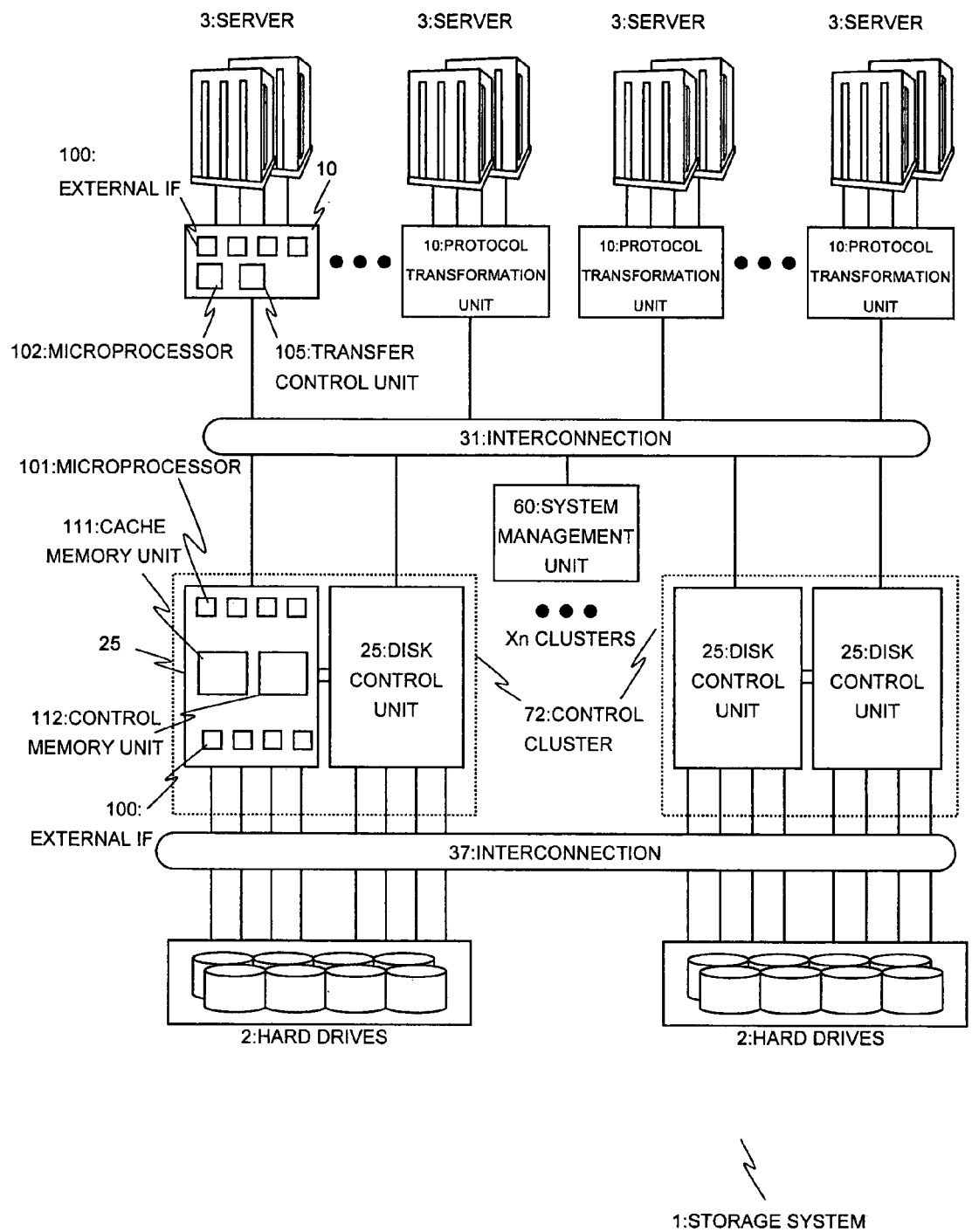
FIG. 32 is a block diagram showing a configuration of the storage system according to a seventh embodiment of the present invention.

FIG. 32 is a block diagram showing the configuration of the storage system according to the seventh embodiment. Components in FIG. 32 that function the same way as those in the first through sixth embodiments are denoted by the same reference numerals, and description on such components is omitted here.

In the seventh embodiment, the servers 3 are connected to the protocol transformation units 10, which are interconnected by the interconnection 31. The hard drives 2 are connected to the disk control units 25 via an interconnection 37. In this case, data can be exchanged between the servers 3 and the protocol transformation units 10 and between the disk control units 25 and the hard drives 2 through paths independent of each other. The load is thus distributed between the two interconnections eliminating a bottleneck.

Each of the disk control units 25 has, as described above referring to FIG. 26, the switch 109 to which two of the internal IFs 126 are connected in order to communicate data and control information through a connection path interconnecting two of the disk control units 25 which assume a control cluster configuration. One of the internal IFs 126 in one of the two disk control units 25 is connected via a connection path to one of the internal IFs 126 in the other disk control unit, so that the two disk control units 25 can communicate data and control information with each other through this connection path. For instance, information to be stored in the cache memory units 111 or control memory units 112 of the two disk control units 25 is duplexed through this connection path enabling, when an error occurs in one of the two disk control units 25 which constitute one of the control clusters 72, the storage system to continue operating by using the other of the two disk control units 25. The storage system can therefore be improved in reliability.

In the thus structured storage system of the seventh embodiment, two interconnections independent of each other connect the control clusters 72 to the protocol transformation units 10 and to the hard drives 2, respectively. Providing interconnections independent of each other could raise the cost, but prevents from interfering data transfer from the disk control units 25 to the protocol transformation units 10 connected to the servers 3 and data transfer from the disk control units 25 to the hard drives 2 each other, unlike the first embodiment. In addition, performance of the storage system 1 can be improved since each interconnection can be structured to meet qualifications for the respective transfer types best. Furthermore, connection paths that connect the disk control units 25 and the hard drives 2 with each other can be set freely, allowing the hard drives 2 to flexibly change their configuration.

Further, the storage system of the seventh embodiment may have, as in the sixth embodiment described above, the system management information memory unit 160 shown in FIG. 31 in place of the system management unit 60 with the microprocessors 101 in one of the disk control units 25 assigned to manage the system. In the thus the need to provide the storage system 1 with the system management unit 60 which has the microprocessor 101 is eliminated and the overall cost of the storage system can accordingly be reduced.

It is also possible to the interconnections 31 may each be divided into the interconnection 41 dedicated to data transfer and the interconnection 42 dedicated to transfer of control information as in the third embodiment (FIG. 27).

EIGHTH EMBODIMENT

Described next is a storage system according to an eighth embodiment of the present invention.

Figure 33:
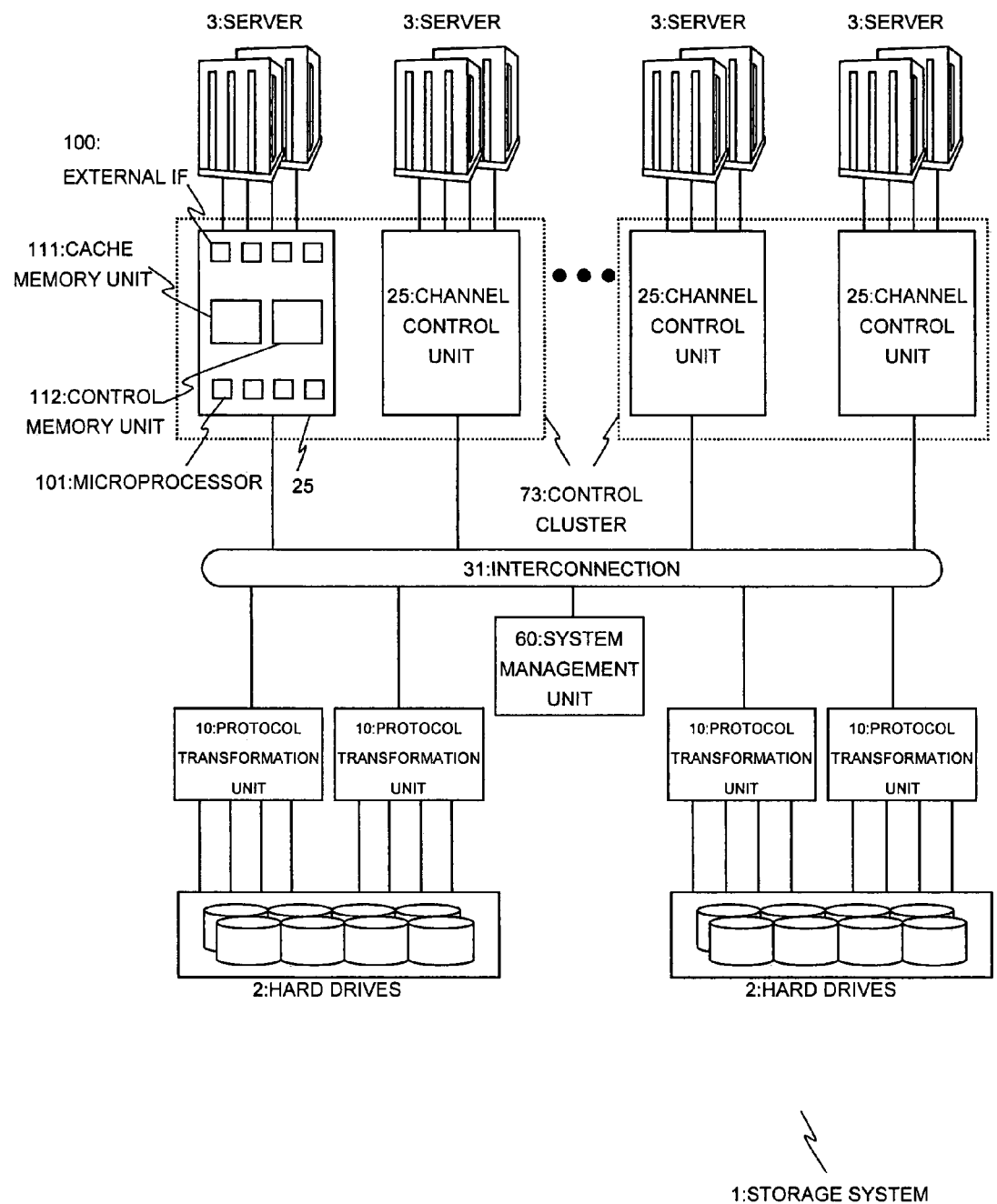
FIG. 33 is a block diagram showing a configuration of the storage system according to an eighth embodiment of the present invention.

FIG. 33 is a block diagram showing the configuration of the storage system according to the eighth embodiment. Components in FIG. 33 that function the same way as those in the first through seventh embodiments are denoted by the same reference numerals, and description on such components is omitted here.

In the eighth embodiment, the servers 3 are connected directly to channel control units 25, which are connected through the interconnection 31 to the protocol transformation units 10. The protocol transformation units 10 are connected to the hard drives 2.

It should be noted that, the channel control units 25 have a configuration identical to disk control units 25, described above, which correspond to control units each constituted of the data caching control units 21 and the protocol transformation units 10. Therefore, the configuration of the disk control units 25, connected to the hard drives 2 is equivalent to the configuration of the channel control units 25, connected to clients such as the servers 3.

The cache memory units 111 of the channel control units 25 store input/output data exchanged between the storage system 1 and the servers 3 connected to the channel control units 25. Two of the channel control units 25 constitute one control cluster 73, and the cache memory units 111 and the control memory units 112 are managed by closed management within the control cluster 73.

Further, although the channel control units 25 constituting a single control cluster 73 are independent of each other in FIG. 33, two of the internal IFs 126 may be connected to the switch 109 of each of the two channel control units 25, which assume a control cluster configuration, in order to communicate data and control information through a connection path interconnecting the two channel control units 25 as shown in FIGS. 25 and 26. One of the internal IFs 126 in one of the two channel control units 25 is connected via a connection path to one of the internal IFs 126 in the other channel control unit, so that the two channel control units 25 can communicate data and control information with each other through this connection path. For instance, information to be stored in the cache memory units 111 or control memory units 112 of the two channel control units 25 is transferred and duplexed through this connection path enabling, when an error occurs in one of the two channel control units 25 which constitute each control cluster 73, the storage system to continue operating by using the other of the two channel control units 25. The storage system can therefore be improved in reliability.

In addition, the channel control units 25 connected to the servers 3 manage cache and control information by closed management within each control cluster 73. In this case, the cache hit ratio is raised, thereby improving the overall throughput of the storage system.

Further, the storage system of the eighth embodiment may have, as in the sixth embodiment described above, the system management information memory unit 160 shown in FIG. 31 in place of the system management unit 60 with the microprocessors 101 in one of the channel control units 25 assigned to manage the system.

Further, the interconnection 31 may be divided into the interconnection 41 dedicated to data transfer and the interconnection 42 dedicated to transfer of control information as in the third embodiment (FIG. 27).

It is also possible to omit the system management unit 60 as in the fifth embodiment (FIGS. 28 and 29). In this case, the microprocessors 101 and 102 logically share the cache memory units 111 and the control memory units 112, and management tables are created in the microprocessors 101 and 102, respectively, to manage the entire storage system 1.

NINTH EMBODIMENT

Described next is a storage system according to a ninth embodiment of the present invention.

Figure 34:
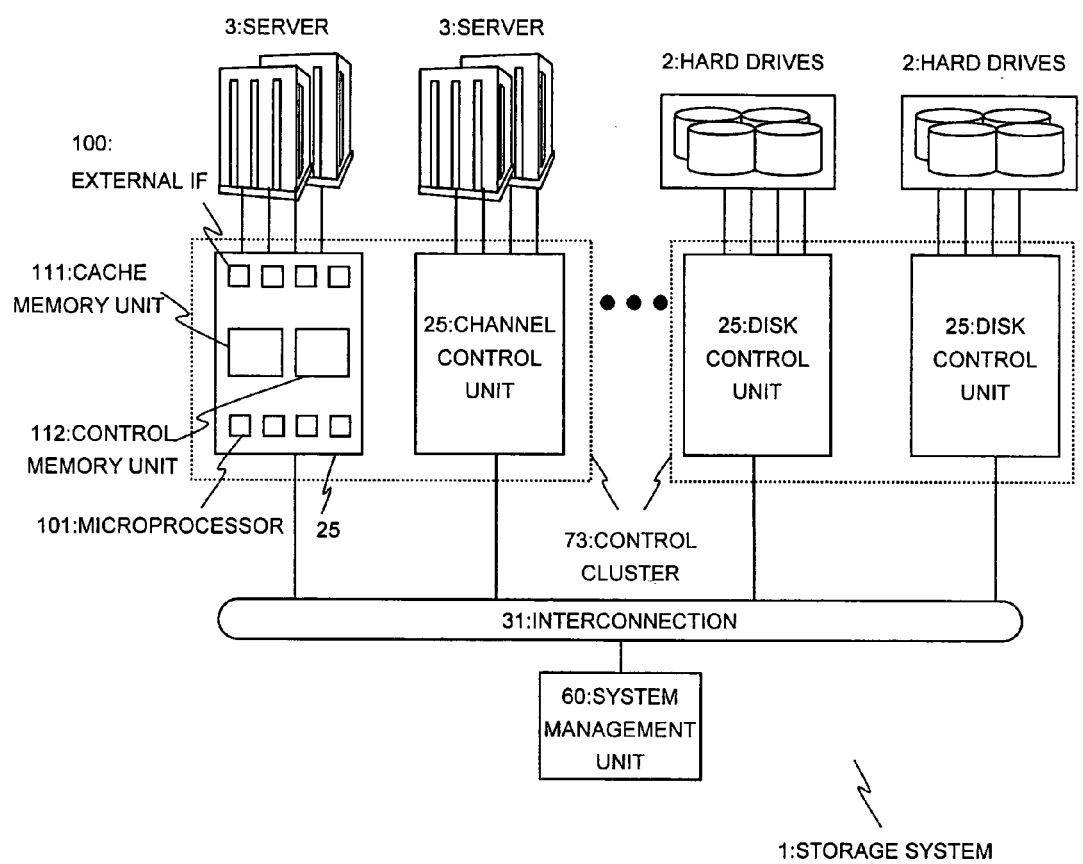
FIG. 34 is a block diagram showing a configuration of the storage system according to a ninth embodiment of the present invention.

FIG. 34 is a block diagram showing the configuration of the storage system according to the ninth embodiment. Components in FIG. 34 that function the same way as those in the first through eighth embodiments are denoted by the same reference numerals, and description on such components is omitted here.

In the ninth embodiment, the channel control units 25 connected to the servers 3 and the disk control units 25 connected to the hard drives 2 are both connected to the interconnection 31. Two of the channel control units 25 or two of the disk control units 25 assume a control cluster configuration.

Although the channel control units 25 constituting one control cluster 73 are independent of each other in FIG. 34, two of the internal IFs 126 may be connected to the switch 109 of each of the two channel control units 25, which assume a control cluster configuration, in order to communicate data and control information through a connection path interconnecting the two channel control units 25 as shown in FIGS. 25 and 26. One of the internal IFs 126 in one of the two channel control units 25 is connected via a connection path to one of the internal IFs 126 in the other channel control unit, so that the two channel control units 25 can communicate data and control information with each other through this connection path. For instance, information to be stored in the cache memory units 111 or control memory units 112 of the two channel control units 25 is transferred and duplexed through this connection path enabling, when an error occurs in one of the two channel control units 25 which constitute one control cluster 73, the storage system is enabled to continue operating by using the other of the two channel control units 25. The storage system can therefore be improved in reliability.

It should be noted that, one control cluster 73 containing the channel control units 25 is provided for the servers 3 while another control cluster 73 containing the disk control units 25 is provided for the hard drives 2, and cache and control information are managed by closed management within each control cluster 73. In this case, while limiting the system configuration to the minimum necessary, thereby cutting back the cost and the cache hit ratio is raised, thereby improving the overall throughput of the system.

Further, the storage system of the ninth embodiment may have, as in the sixth embodiment described above, the system management information memory unit 160 shown in FIG. 31 in place of the system management unit 60 with the microprocessors 101 in one of the channel control units 25 or the disk control units 25 assigned to manage the system.

In addition, the interconnection 31 may be divided into the interconnection 41 dedicated to data transfer and the interconnection 42 dedicated to transfer of control information as in the third embodiment (FIG. 27).

It is also possible to omit the system management unit 60 as in the fifth embodiment (FIGS. 28 and 29). In this case, the microprocessors 101 and 102 logically share the cache memory units 111 and the control memory units 112, and management tables are created in the microprocessors 101 and 102, respectively, to manage the entire storage system 1.

TENTH EMBODIMENT

Described next is a storage system according to a tenth embodiment of the present invention.

Figure 35:
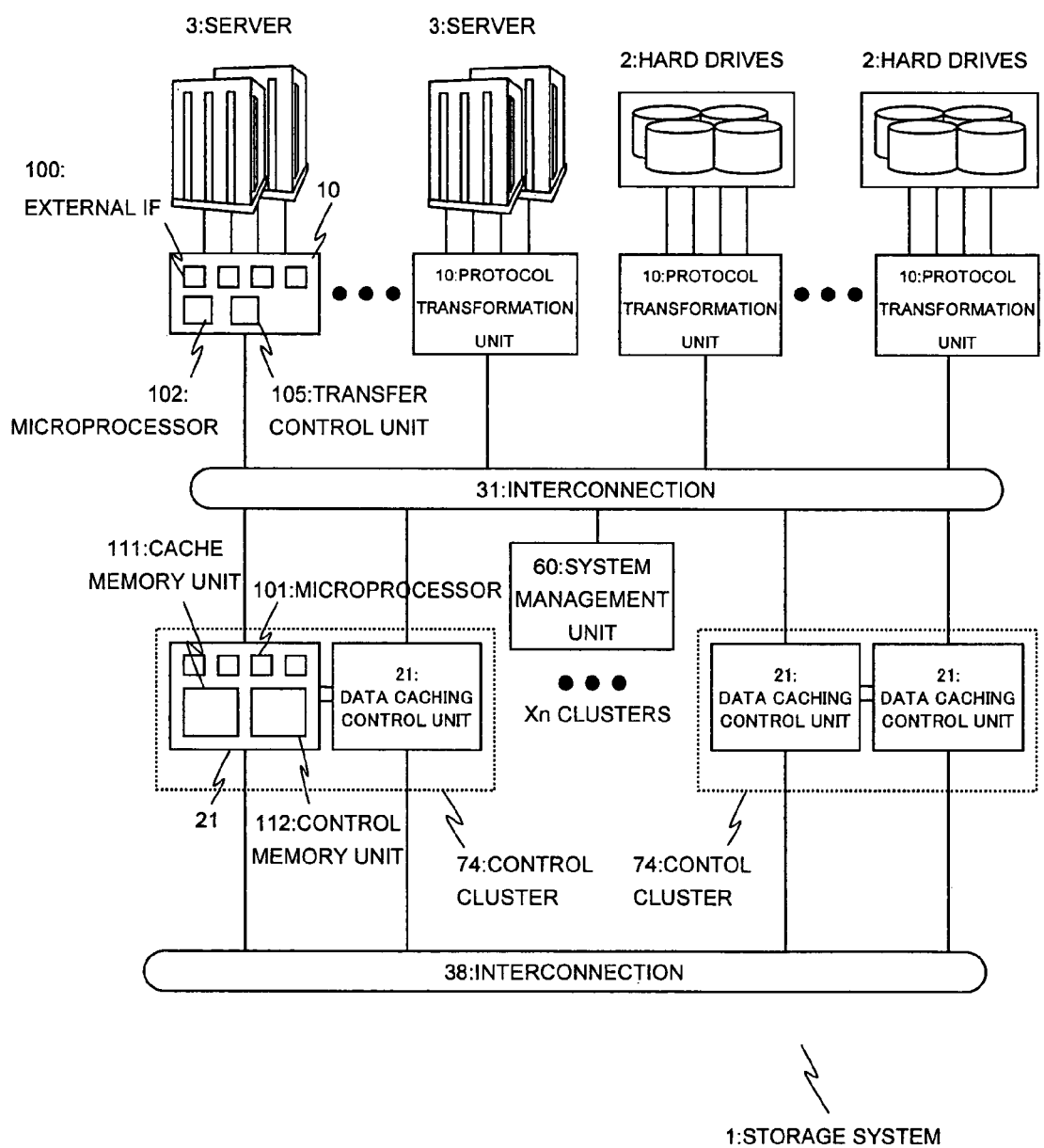
FIG. 35 is a block diagram showing a configuration of the storage system according to a tenth embodiment of the present invention.

FIG. 35 is a block diagram showing the configuration of the storage system according to the tenth embodiment. FIG. 35 is similar to FIG. 1 of the first embodiment, and the only difference between the two is that FIG. 35 has an interconnection 38, which differs from the interconnection 31, connected to the data caching control units 21. Components in FIG. 35 that act the same way as those in the first through ninth embodiments are denoted by the same reference numerals, and description on such components is omitted here.

The interconnection 38 connected to the data caching control units 21 enables the data caching control units 21 to transfer the contents stored in the cache memory units 111 or control memory units 112 of the data caching control units 21 to one another. The data caching control units 21 which assume a cluster configuration are connected to one another through paths as has been described referring to FIG. 10.

With the interconnection that interconnects the data caching control units 21 provided aside from the interconnection 31, data transfer between the protocol transformation units 10 connected to the servers 3 is handled by the interconnection 31 while data transfer between the data caching control units 21 is handled by the interconnection 38, thereby preventing the two from interfering each other. In addition, the interconnection 31 and the interconnection 38 can each be structured to meet qualifications for the respective data transfer types best.

The thus structured storage system of the tenth embodiment uses the interconnection 38 to interconnect the data caching control units 21, thereby facilitating exchange of control information, cache data, and the like between the data caching control units 21. In particular, in the case where the data caching control units 21 are newly added as a result of a system modification or the like, cache and control information stored in the existing data caching control units 21 can be sent through the interconnection 38 to the added data caching control units 21, where no cache or control information is stored yet, without affecting data transfer between the servers 3 and the hard drives 2 in spite of data exchange being performed between the data caching control units 21. The overall throughput of the system is therefore improved.

It should be noted that, the storage system of the tenth embodiment may have the system management information memory unit 160 shown in FIG. 31 in place of the system management unit 60 with the microprocessors 101 in one of the data caching control units 21 assigned to manage the system.

Further, the interconnections 31 and 38 may each be divided into the interconnection 41 dedicated to data transfer and the interconnection 42 dedicated to transfer of control information as in the third embodiment (FIG. 27).

It is also possible to omit the system management unit 60 from the storage system 1 of this embodiment as in the fifth embodiment (FIGS. 28 and 29). In this case, the microprocessors 101 and 102 logically share the cache memory units 111 and the control memory units 112, and management tables are created by the microprocessors 101 and 102, respectively, to manage the entire storage system 1.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:

plural protocol transformation units that each comprise an interface to one of an external equipment and a hard drive unit, and convert, into a protocol within the storage system, a protocol for read and write for data exchanged with the one of the external equipment and the hard drive unit;

plural data caching control units each comprising a cache memory that stores data read from/written to the hard drive unit and a microprocessor that controls the cache memory; and a management information memory unit that stores management information on the storage system, wherein the plural protocol transformation units and the plural data caching control units are connected to each other through an interconnection;

wherein the plural data caching control units are divided into plural control clusters each comprising at least two or more data caching control units;

control of the cache memory is conducted independently for each of the plural control clusters; and one of the plural data caching control units having at least one processor and manages, as a single system, the plural protocol transformation units and the plural control clusters, by the processor in the one of the plural data caching control units, reading the management information stored in the management information memory unit.

2. A storage system, comprising:

plural protocol transformation units that each comprise an interface to an external equipment, and convert, into a protocol within the storage system, a protocol for read and write for data exchanged with the external equipment; and plural disk control units each comprising plural interfaces that each convert, into a protocol within the storage system, a protocol for read and write for data exchanged with a hard drive unit, a cache memory that stores data read from/written to the hard drive unit, and a microprocessor that controls the cache memory, wherein the plural protocol transformation units and the plural disk control units are connected to each other through a first interconnection;

wherein the plural disk control units and the hard drive unit are connected to each other through a second interconnection;

wherein the plural disk control units are divided into plural control clusters each comprising at least two or more disk control units;

control of the cache memory is conducted independently for each of the plural control clusters;

the plural disk control units included in each of the plural control clusters, and wherein one of the plural disk control units having at least one processor and manages, as a single system, the plural protocol transformation units and the plural control clusters, by the processor in the one of the plural disk control units, based on management information of the storage system.

3. A storage system, comprising:

plural protocol transformation units that each comprise an interface to a hard drive unit, and convert, into a protocol within the storage system, a protocol for read and write for data exchanged with the hard drive unit; and plural channel control units each comprising plural interfaces that each convert, into a protocol within the storage system, a protocol for read and write for data exchanged with an external equipment, a cache memory that stores data read from/written to the hard drive unit, and a microprocessor that controls the cache memory, wherein the plural protocol transformation units and the plural channel control units are connected to each other through an interconnection;

wherein the plural channel control units are divided into plural control clusters each comprising two or more channel control units;

wherein the cache memory of each of the plural channel control units within each of the plural control clusters stores only data to be used by the external equipment connected to each of the plural interfaces within each of the plural control clusters;

control of the cache memory and management of a storage area of the hard drive unit are conducted independently for each of the plural control clusters, and wherein one of the plural channel control units having at least one processor and manages, as a single system, the plural protocol transformation units and the plural control clusters, by the processor in the one of the plural channel control units, based on management information of the storage system.

4. A storage system, comprising:

plural channel control units each comprising plural interfaces that each convert, into a protocol within the storage system, a protocol for read and write for data exchanged with one of an external equipment and a hard drive unit, a cache memory that stores data read from/written to the one of the external equipment and the hard drive unit, and a microprocessor that controls the cache memory, wherein the plural channel control units are connected to one another through an interconnection;

wherein the plural channel control units are divided into plural control clusters each comprising two or more channel control units;

control of the cache memory is conducted independently for each of the plural control clusters, wherein one of the plural channel control units having at least one processor and manages, as a single system, the plural control clusters, by the processor in the one of the plural channel control units, based on management information of the storage system.

5. A storage system, comprising:

plural protocol transformation units that each convert, into a protocol within the storage system, a protocol for read and write for data exchanged with one of an external equipment and a hard drive unit; and plural data caching control units each comprising a cache memory that stores data read from/written to the one of the external equipment and the hard drive unit and a microprocessor that controls the cache memory, wherein the plural protocol transformation units and the plural data caching control units are connected to each other through a first interconnection;

wherein the plural data caching control units are connected to one another through a second interconnection;

wherein the plural data caching control units are divided into plural control clusters each comprising two or more data caching control units;

wherein the plural data caching control units included in each of the plural control clusters are connected to one another;

control of the cache memory is conducted independently for each of the plural control clusters; and wherein one of the plural data caching control units having at least one processor and manages, as a single system, the plural protocol transformation units and the plural control clusters, by the processor in the one of the plural data caching control units, based on management information of the storage system.

6. The storage system according to one of claims 1, 3, and 4, wherein the interconnection is divided into a third interconnection that transfers the data read/written and a fourth interconnection that transfers control information for managing the storage system.

7. The storage system according to claims 2 or 5, wherein the first interconnection is divided into a third interconnection that transfers the data read/written and a fourth interconnection that transfers control information for managing the storage system.

8. A storage system, comprising:

plural protocol transformation units that each comprise an interface to one of an external equipment and a hard drive unit, and convert, into a protocol within the storage system, a protocol for read and write for data exchanged with the one of the external equipment and the hard drive unit; and plural data caching control units each comprising a cache memory that stores data read from/written to the hard drive unit and a microprocessor that controls the cache memory, wherein the plural protocol transformation units and the plural data caching control units are connected to each other through an interconnection wherein the plural data caching control units are divided into plural control clusters each comprising two or more data caching control units;

control of the cache memory is conducted independently for each of the plural control clusters;

one of the plural data caching control units store management information on the storage system; and one of the plural data caching control units having at least one processor and manages, as a single system, the plural protocol transformation units and the plural control clusters, by the processor in the one of the plural data caching control units, based on management information of the storage system.

9. A storage system, comprising:

plural protocol transformation units that each comprise an interface to an external equipment, and convert, into a protocol within the storage system, a protocol for read and write for data exchanged with the external equipment; and plural disk control units each comprising plural interfaces that each convert, into a protocol within the storage system, a protocol for read and write for data exchanged with a hard drive unit, a cache memory that stores data read from/written to the hard drive unit, and a microprocessor that controls the cache memory, wherein the plural protocol transformation units and the plural disk control units are connected to each other through a first interconnection;

wherein the plural disk control units and the hard drive unit are connected to each other through a second interconnection;

wherein the plural disk control units are divided into plural control clusters each comprising at least two or more disk control units;

control of the cache memory is conducted independently for each of the plural control clusters;

the plural disk control units included in each of the plural control clusters are connected to one another;

one of the plural disk control units store management information on the storage system; and one of the plural disk control units having at least one processor and manages, as a single system, the plural protocol transformation units and the plural control clusters, by the processor in the one of the plural disk control units, based on management information of the storage system.

10. A storage system, comprising:

plural protocol transformation units that each comprise an interface to a hard drive unit, and convert, into a protocol within the storage system, a protocol for read and write for data exchanged with the hard drive unit; and plural channel control units each comprising plural interfaces that each convert, into a protocol within the storage system, a protocol for read and write for data exchanged with an external equipment, a cache memory that stores data read from/written to the hard drive unit, and a microprocessor that controls the cache memory, wherein the plural protocol transformation units and the plural channel control units are connected to each other through an interconnection;

wherein the plural channel control units are divided into plural control clusters each comprising at least two or more channel control units;

wherein the cache memory of each of the plural channel control units within each of the plural control clusters stores only data to be used by the external equipments connected to each of the plural interfaces within each of the plural control clusters;

one of the plural channel control units store management information on the storage system;

control of the cache memory and management of a storage area of the hard drive unit are conducted independently for each of the plural control clusters; and one of the plural channel control units having at least one processor and manages, as a single system, the plural protocol transformation units and the plural control clusters, by the processor in the one of the plural channel control units, based on management information of the storage system.

11. A storage system, comprising plural channel control units each comprising plural interfaces that each convert, into a protocol within the storage system, a protocol for read and write for data exchanged with one of an external equipment and a hard drive unit, a cache memory that stores data read from/written to the one of the external equipment and the hard drive unit, and a microprocessor that controls the cache memory, wherein the plural channel control units are connected to one another through an interconnection;

wherein the plural channel control units are divided into plural control clusters each comprising at least two or more channel control units;

control of the cache memory is conducted independently for each of the plural control clusters;

one of the plural channel control units store management information on the storage system; and one of the plural channel control units having at least one processor and manages the plural control clusters as a single system, by the processor in the one of the plural channel control units, based on management information of the storage system.

12. A storage system, comprising:

plural protocol transformation units that each convert, into a protocol within the storage system, a protocol for read and write for data exchanged with one of an external equipment and a hard drive unit; and plural data caching control units each comprising a cache memory that stores data read from/written to the one of the external equipment and the hard drive unit and a microprocessor that controls the cache memory, wherein the plural protocol transformation units and the plural data caching control units are connected to each other through a first interconnection;

wherein the plural data caching control units are connected to one another through a second interconnection;

wherein the plural data caching control units are divided into plural control clusters each comprising at least two or more data caching control units;

wherein the plural data caching control units included in each of the plural control clusters are connected to one another;

control of the cache memory is conducted independently for each of the plural control clusters;

one of the plural data caching control units stores management information on the storage system; and one of the plural data caching control units having at least one processor and manages, as a single system, the plural protocol transformation units and the plural control clusters, by the processor in the one of the plural data caching control units, based on management information of the storage system.

13. A storage system, comprising:

plural hard disk drives; and a controller, the controller comprising:

plural channel control units that are each connected to an external equipment;

a disk control unit that is connected to the hard disk drives;

a cache memory that temporarily stores data stored in the hard disk drives; and an interconnection that connects the channel control units and the disk control unit, the channel control units each comprising:

a control memory that stores control information on data transfer; and a processor that controls the data transfer, wherein the processor transfers data, which has been sent from the external equipment, from the channel control unit to the cache memory to store the data, reads data from the cache memory, transfers the data to the disk control unit, and instructs the disk control unit to write data to the hard disk drive; and wherein the disk control unit converts a data transfer protocol within the controller into a protocol that allows input/output with respect to the hard disk drive, and wherein the plural channel control units are divided into plural control clusters each comprising two or more channel control units, and wherein one of the plural channel control units having at least one processor and manages, as a single system, the plural control clusters, by the processor in the one plural channel control units, based on management information of the storage system.

14. The storage system according to claim 13, wherein the processor further instructs the disk control unit to read data from the hard disk drive, transfers data, which has been read from the hard disk drive, from the disk control unit to the cache memory to store the data in the cache memory, reads data from the cache memory, and transfers the data from the channel control unit to the external equipment.

15. The storage system according to claim 13, further comprising:

a control memory that stores control information on the storage system, wherein the control memory is connected to the interconnection.

16. The storage system according to claim 15, wherein the processor controls the storage system based on the control information.

17. The storage system according to claim 13, wherein the interconnection comprises:

a first interconnection for transfer of data and a second interconnection for transfer of control information.

18. The storage system according to claim 15, wherein the interconnection comprises:

a first interconnection for transfer of data and a second interconnection for transfer of control information; and the control memory is connected to the second interconnection.

* * * * *